(12) United States Patent
Robinson et al.

(10) Patent No.: US 9,237,826 B2
(45) Date of Patent: Jan. 19, 2016

(54) SANDWICH PRESS AND GRILL APPARATUS

(75) Inventors: Nicholas Robinson, Bronte (AU);
Lochana Subasekara Widanagamage Don, Caringbah (AU)

(73) Assignee: Breville Pty Limited, Alexandria, New South Wales (AU)

( * ) Notice: Subject to any disclaimer, the term of this patent is extended or adjusted under 35 U.S.C. 154(b) by 686 days.

(21) Appl. No.: 13/393,831

(22) PCT Filed: Sep. 9, 2010

(86) PCT No.: PCT/AU2010/001170
§ 371 (c)(1),
(2), (4) Date: Mar. 2, 2012

(87) PCT Pub. No.: WO2011/029146
PCT Pub. Date: Mar. 17, 2011

(65) Prior Publication Data
US 2012/0152126 A1      Jun. 21, 2012

(30) Foreign Application Priority Data

Sep. 10, 2009    (AU) ................................ 2009904375

(51) Int. Cl.
*A47J 27/62*         (2006.01)
*A47J 37/06*         (2006.01)
(52) U.S. Cl.
CPC .................................. *A47J 37/0611* (2013.01)
(58) Field of Classification Search
CPC .. A47J 37/06; A47J 37/0611; A47L 2037/06; A47L 2037/0611; A47L 2037/0627; H05B 3/68; A21B 5/023

USPC ........... 99/331, 332, 333, 372, 375, 376, 377, 99/378
See application file for complete search history.

(56) References Cited

U.S. PATENT DOCUMENTS

| | | | |
|---|---|---|---|
| 3,799,047 A * | 3/1974 | Freeman | 99/332 |
| 6,341,555 B1 * | 1/2002 | Chang | 99/337 |
| 2004/0020371 A1 * | 2/2004 | Patenotre et al. | 99/331 |
| 2006/0213373 A1 * | 9/2006 | Fernandez et al. | 99/349 |
| 2007/0095817 A1 * | 5/2007 | Gruaz | 219/486 |
| 2007/0101538 A1 * | 5/2007 | Gruaz | 16/34 |

* cited by examiner

*Primary Examiner* — Dana Ross
*Assistant Examiner* — Brandon Harvey
(74) *Attorney, Agent, or Firm* — Molins & Co., Pty. Ltd.

(57) ABSTRACT

A sandwich press and grill apparatus. The apparatus comprising a lower housing and an upper housing, each hingedly interconnected. The lower housing is adapted to releasably engage a lower cooking plate, the lower housing including a first temperature sensor adapted to be in thermal communication with the lower cooking plate when engaged. The upper housing is adapted to releasably engage the upper cooking plate, the upper housing including a second temperature sensor adapted to be in thermal communication with the upper cooking plate when engaged. The lower housing has a first releasable power coupling element for providing electrical power to a lower heating element integrally formed with the lower cooking plate, and the upper housing has a second releasable power coupling element for providing electrical power to an upper heating element integrally formed with the upper cooking plate. A temperature controller adapted to receive at least one temperature set point signal and to independently control the temperature of the lower cooking plate and the upper cooking plate.

15 Claims, 25 Drawing Sheets

SANDWICH PRESS AND GRILL APPARATUS

FIELD OF THE INVENTION

The present invention relates to cooking appliances and in particular to cooking appliances for grilling.

The invention has been developed primarily for use as a sandwich press and/or grill, and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

A sandwich press typically has a lower housing that supports a lower cooking surface. The upper cooking surface is carried by an upper housing that pivots about a 'U' shaped frame. The 'U' shaped frame further comprises a transverse handle that allows the user to raise and lower the upper housing. In a typical sandwich press, the upper and lower cooking surfaces are flat.

Similar configurations are used in electric grills. However, the operating temperature of an electric grill is higher than that of a typical sandwich press. In these types of grills, both the top the upper and lower cooking surfaces include parallel ribs, which provide cooked meat with characteristic sear marks and also promote the run off of cooking juices.

Typically, a sandwich press and electric grill are each configured to perform their one specific task.

OBJECT OF THE INVENTION

It is an object of the present invention to overcome or ameliorate at least one of the disadvantages of the prior art, or to provide a useful alternative.

It is an object of the invention in its preferred form to provide a combination sandwich press and grill apparatus. More preferably, the combination sandwich press and grill apparatus is selectively configurable with replaceable cooking surfaces (or cooking hot plates) for enabling both cooking functions.

SUMMARY OF THE INVENTION

According to a first aspect of the invention there is provided a sandwich press and grill apparatus comprising:
  a lower housing and an upper housing, each hingedly interconnected;
  wherein the lower housing is adapted to releasably engage a lower cooking plate, the lower housing including a temperature sensor adapted to be in thermal communication with an engaged lower cooking plate;
  wherein the upper housing is coupleable to an upper cooking plate; and
  a temperature controller adapted to receive at least one temperature set point signal and to control the temperature of the lower cooking plate and the upper cooking plate.

The upper housing can preferably be adapted to releasably engage an upper cooking plate. The upper housing preferably includes a temperature sensor adapted to be in thermal communication with the upper cooking plate. More preferably, the upper housing includes a temperature sensor adapted to be in thermal communication with the upper cooking plate for enabling independent temperature control of the upper cooking plate. Most preferably, the upper cooking plate and lower cooking plate are interchangeable.

According to a second aspect of the invention there is provided a sandwich press and grill apparatus comprising:
  a lower housing and an upper housing, each hingedly interconnected;
  wherein the lower housing is adapted to releasably engage a lower cooking plate, the lower housing including a temperature sensor adapted to be in thermal communication with an engaged lower cooking plate;
  wherein the upper housing is adapted to releasably engage an upper cooking plate, the upper housing including a temperature sensor adapted to be in thermal communication with an engaged upper cooking plate; and
  a temperature controller adapted to receive at least one temperature set point signal and to control the temperature of the lower cooking plate and the upper cooking plate.

Preferably, the apparatus is adapted to function as a sandwich toasting press and a meat grill. More preferably, the apparatus can be opened from a fully closed position to a full open grill position.

Preferably, a set cooking temperature of the upper cooking plate or lower cooking plate is user controllable. Temperature control set point is preferably set by a rotating temperature control knob (or dial). More preferably, the set cooking temperature of the upper cooking plate and lower cooking plate are independently controllable. Independent control set points are preferably set by respective rotating temperature control knobs. A temperature control knob is preferably located on a control panel on the lower housing.

The lower housing preferably includes a first power coupling for providing electrical power to a heating element of the engaged lower cooking plate. The upper housing preferably includes a second power coupling for providing electrical power to a heating element of the engaged upper cooking plate.

Preferably, the power coupling defines three power socket elements, each adapted to receive a co-operative power contact element of a respective heating element. The three socket elements preferably couple a ground connection and two power connections for providing electrical power to the respective heating element. More preferably, the power coupling has a guard for shielding the power socket element when a corresponding cooking plate is not engaged.

The power coupling guard is preferably automatically slideably movable in co-operation with receiving an electrical contact element of a respective heating element. More preferably, the guard is automatically slideably movable in co-operation with receiving an electrical contact element selected to couple a ground connection. Most preferably, the ground connection between the power coupling and respective heating element is made before the power connection.

Each temperature sensor is preferably biased to abut a respective cooking plate in providing thermal communication.

Preferably the temperature sensor includes a thermistor for providing a temperature signal to the temperature controller. More preferably, the temperature sensor includes a thermostat for providing over-heat cut-off.

Preferably the apparatus further comprises a shut-off switch for automatically enabling voltage at the power coupling when a respective cooking plate is engaged. More preferably, the bias of a temperature sensor to abut a respective cooking plate in providing thermal communication is integral to the shut-off switch.

Preferably, a lower cooking plate and an upper cooking plate are removably interchangeable. More preferably, the lower cooking plate or upper cooking plate comprise a grill cooking surface having ribs that are positioned parallel with the sides of the device. The ribs are preferably of even height. Alternatively, the ribs may be tapered, being higher at a front than at a rear, for allowing a tip of a rib to remain generally horizontal while still providing drainage of an inclined surface that occupies a space between and around the ribs. Alternatively, the upper cooking plate or lower cooking plate can comprise a substantially flat cooking surface.

Preferably, run off is deposited into a full length drip tray. More preferably, the drip tray collects from the centre of each cooking surface. Most preferably, the drip tray is carried by the lower housing.

Preferably the upper housing is supported by a 'U' shaped frame having two side arms hingedly connected to the lower housing. More preferably, each side arm of the 'U' shaped frame has a pivot for supporting the upper housing. The 'U' shaped frame is preferably hinged to the lower cooking housing, having an intermediate and locked orientation. Preferably a hinge assembly for establishing the intermediate and locked orientation is at least partially concealed within the 'U' shaped frame and the lower cooking housing.

Preferably, the 'U' shaped frame has a cross-piece that serves as a handle. More preferably, the handle is adapted to make contact with a bench or counter top so as to support the upper housing in the fully open grill configuration.

Preferably, the upper housing and the upper cooking plate are restrained from pivoting when in the full open grill position.

Preferably, the 'U' shaped frame is hinged to provide an intermediate and locked orientation that can be defeated so that the device can be opened to a fully open grill orientation. More preferably, the hinge assembly, once having been defeated, is adapted to be reset without further intervention when the user closes the device, so that a subsequent attempt to open the unit encounters the intermediate and locked orientation.

Preferably, the lower cooking surface or upper cooking surface is tilt adjustable. More preferably, tilt adjustment can comprises a rotatable knob on a control panel of a respective housing.

Preferably a locking assembly enables the upper housing and lower housing to be locked together for storage purposes. More preferably, the upper housing can be spaced apart from and above the lower housing in a plurality of discreet steps.

Preferably, the temperature controller is operatively associated with a control panel. More preferably, the control panel includes any one or more of the following: a temperature control dial for setting the least one temperature set point signal; a timer control dial for setting a user defined time period; and a display element for displaying data indicative of the least one temperature set point and the user defined time period.

According to a further aspect of the invention there is provided a sandwich press and grill apparatus comprising:
a lower housing and an upper housing, each hingedly interconnected;
wherein the lower housing is coupleable to a lower cooking plate; and
wherein the upper housing is coupleable to an upper cooking plate; and a temperature controller adapted to receive at least one temperature set point signal and to control the temperature of the lower cooking plate and the upper cooking plate;
wherein the temperature controller is operatively associated with a control panel.

Preferably, the control panel includes a display element. More preferably, the display element is an LCD display element. Most preferably, the display element can be a colour display element.

Preferably, the control panel includes a temperature control dial. More preferably, the control panel further includes and a timer control dial. Most preferably, the control panel includes a control dial for controlling a user defined temperature set point and a user defined time period.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Figure 1A:
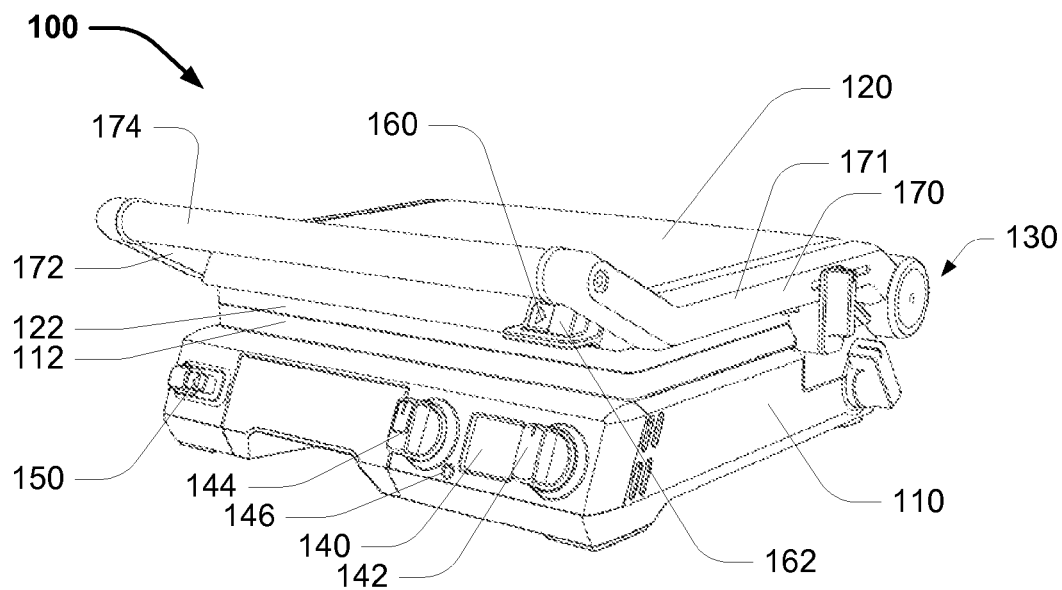
FIG. 1A is a perspective view of an example sandwich press and grill apparatus according to the invention, shown in the fully closed storage configuration.
Figure 1B:
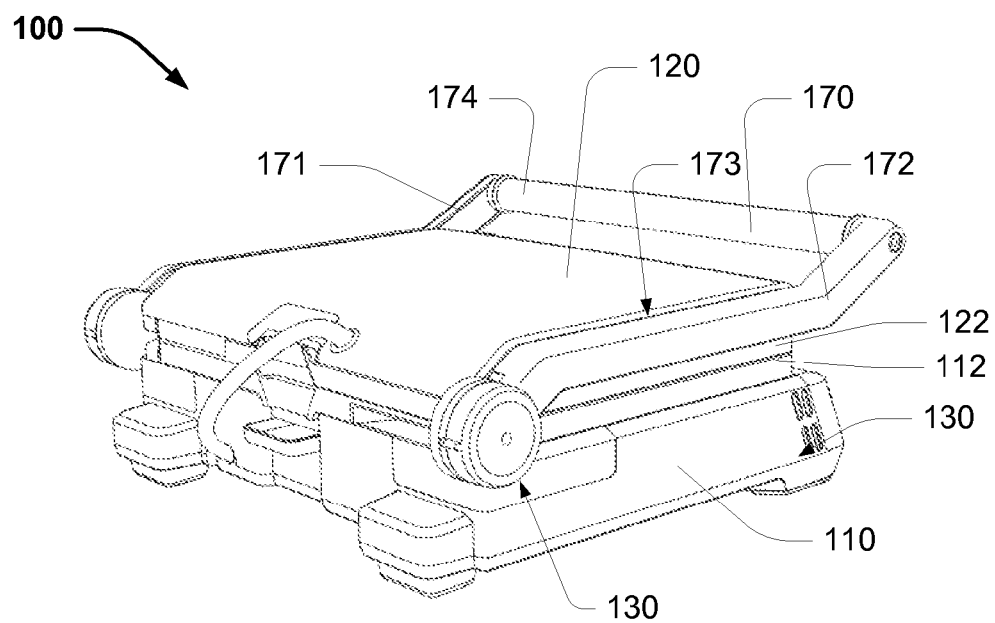
FIG. 1B is a perspective view of the apparatus according to FIG. 1A.
Figure 1C:
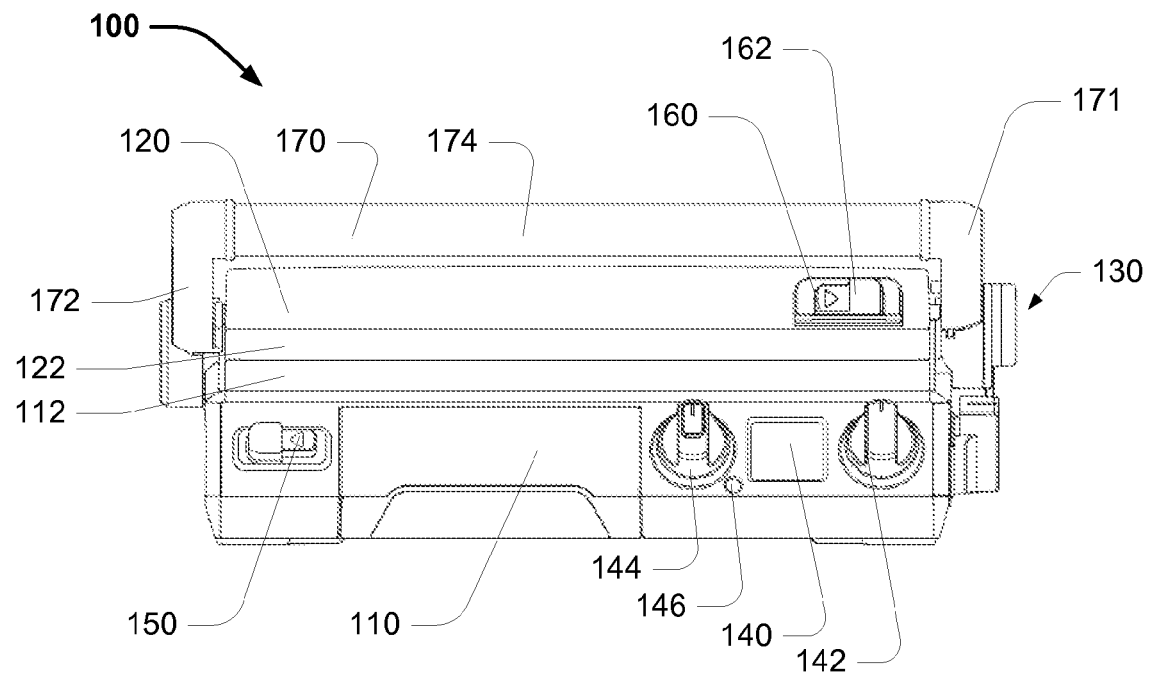
FIG. 1C is a front view of the apparatus according to FIG. 1A.
Figure 1D:
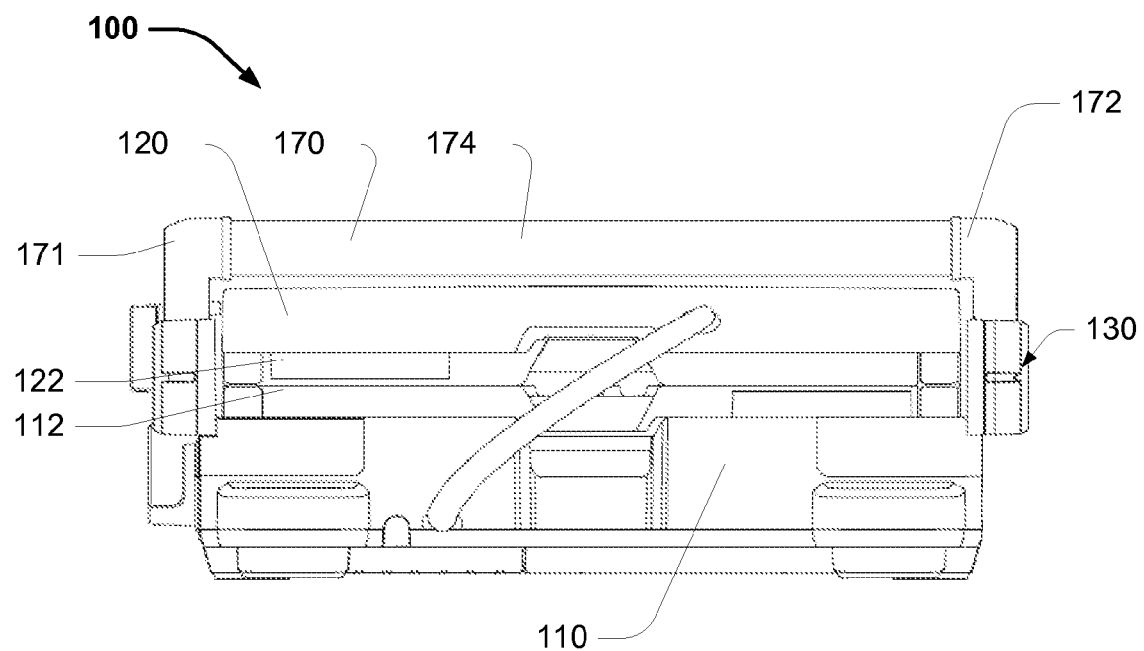
FIG. 1D is a rear view of the apparatus according to FIG. 1A.
Figure 1E:
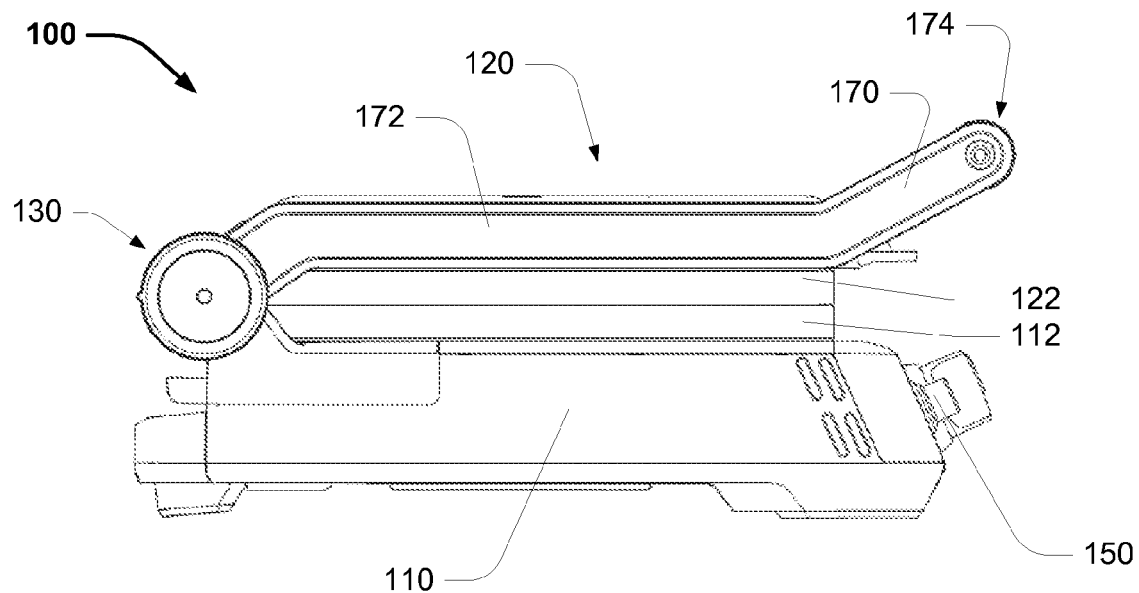
FIG. 1E is a side view of the apparatus according to FIG. 1A.
Figure 1F:
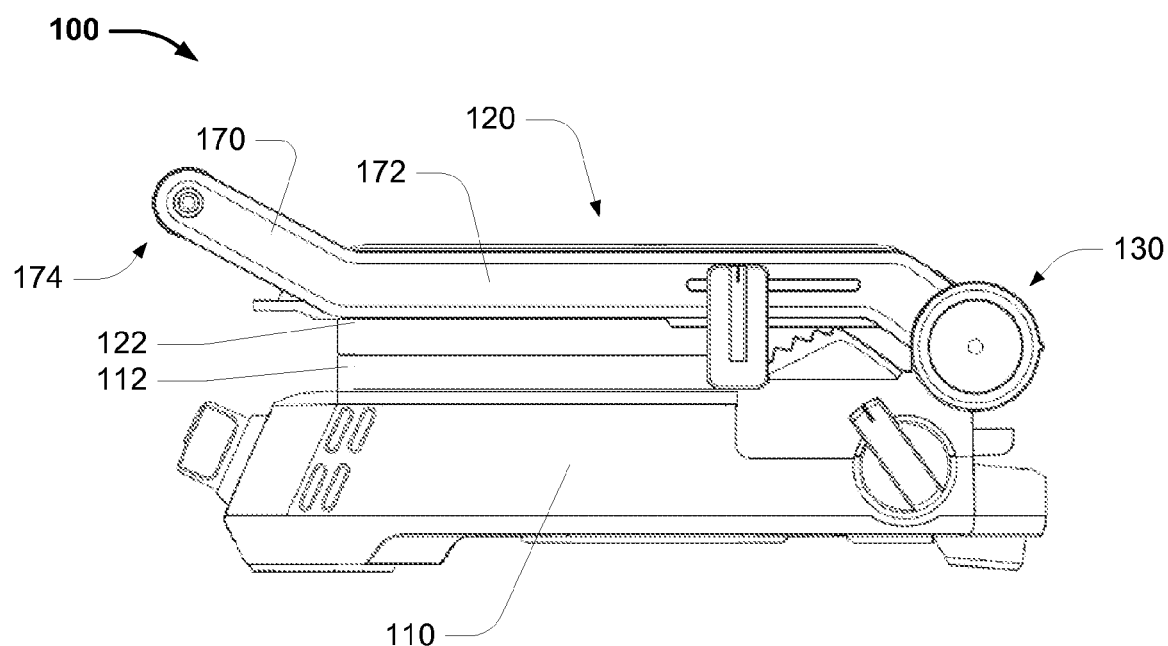
FIG. 1F is a side view of the apparatus according to FIG. 1A.
Figure 1G:
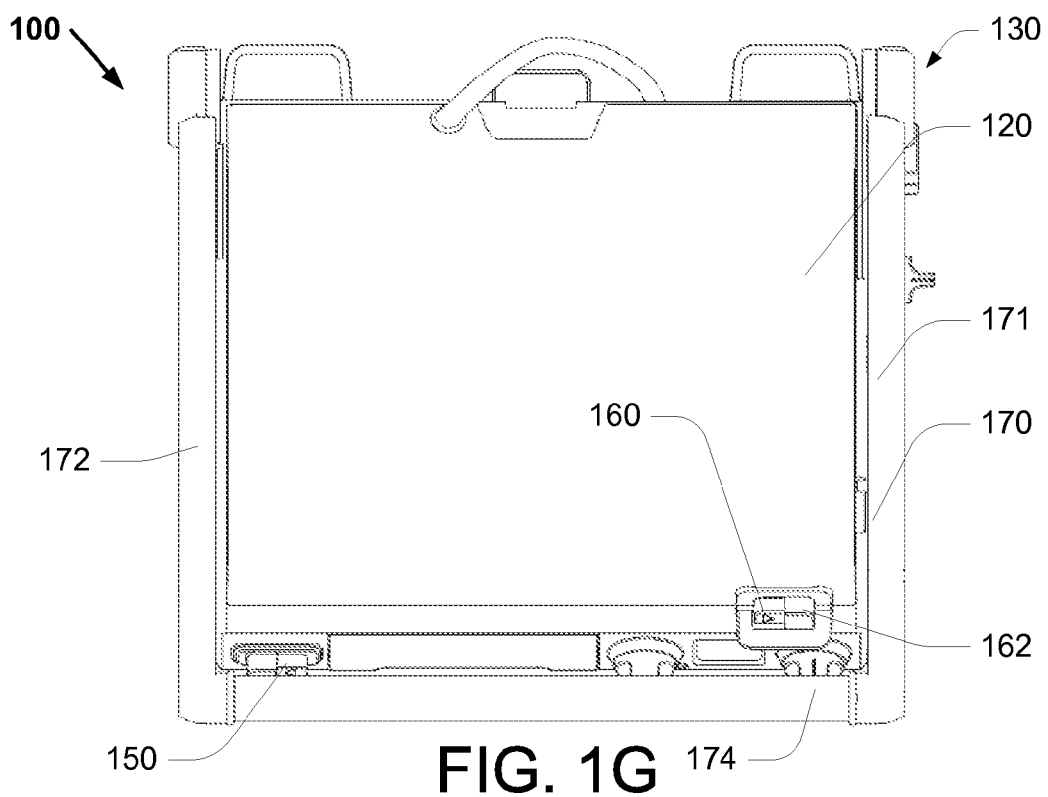
FIG. 1G is a top view of the apparatus according to FIG. 1A.
Figure 1H:
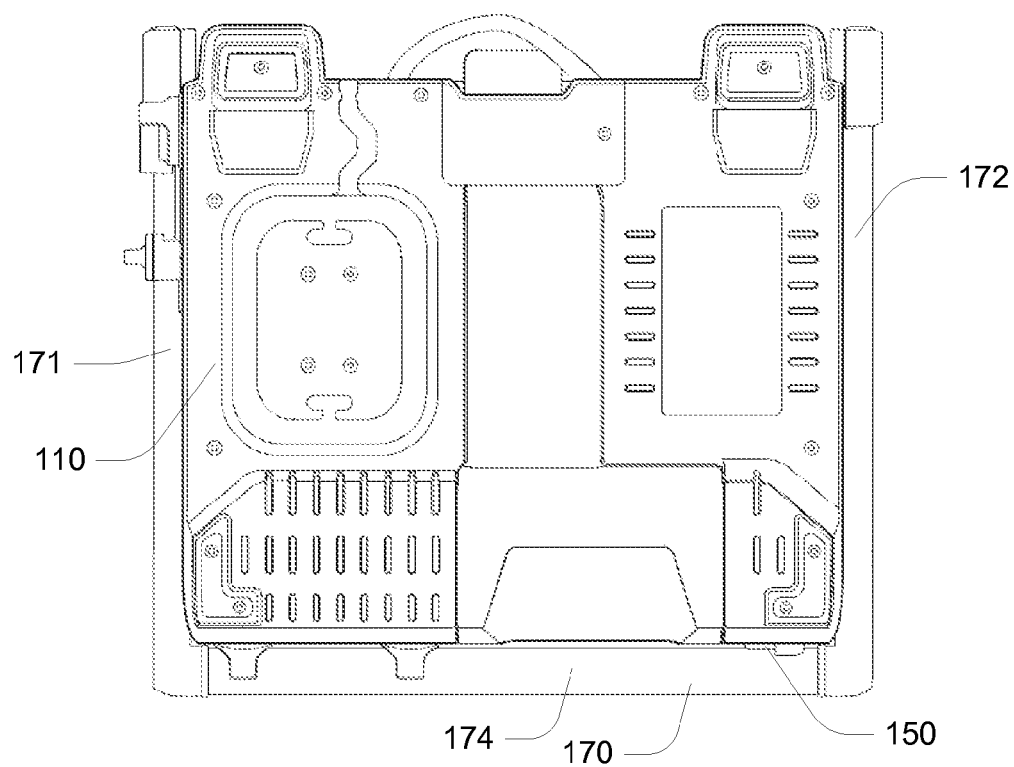
FIG. 1H is a bottom view of the apparatus according to FIG. 1A.

Referring to the drawings, there is provided a sandwich press and grill apparatus 100. The apparatus comprises a lower housing 110 and an upper housing 120. The lower housing and upper housing are hingedly interconnected by a hinge assembly 130. The lower housing 110 is adapted to releasably engage a lower cooking plate 112. The upper housing 120 is releasably coupled to an upper cooking plate 122.

A temperature controller 140 is adapted to receive at least one temperature set point signal from a control knob (or dial) 142, and to control the temperature of the lower cooking plate and the upper cooking plate. A timer control knob (or dial) 144 can also be operatively associate with the temperature controller for setting or adjusting a cooking time. A toggle button 146 can also be provided for presenting displayed plate temperatures and/or temperature settings in either Degrees Fahrenheit or Degrees Celsius.

A first (or lower) lock release 150 is provided to enable release of the lower cooking plate 112 from the lower housing 110. A second (or upper) lock release 160 is provided to enable release of the upper cooking plate 122 from the upper housing 120.

In an embodiment, by way of example only, the upper housing is supported by a 'U' shaped frame 170, having two side arms 171,172 hingedly connected to the lower housing by the hinge assembly 130. Each side arm 171,172 has a pivot 173 for supporting the upper housing. The pivot attaches the upper housing to each side arm of the 'U' shaped frame at points approximately mid way along each arm. The hinge assembly is at least partially concealed within the 'U' shaped frame and the lower cooking housing. The 'U' shaped frame has a cross-piece that serves as a handle 174. These hinge components support an internal hinge locking assembly as well as one end of a generally 'U' shaped frame for supporting the upper housing. The hinge assembly enables an intermediate and locked orientation.

Figure 2:
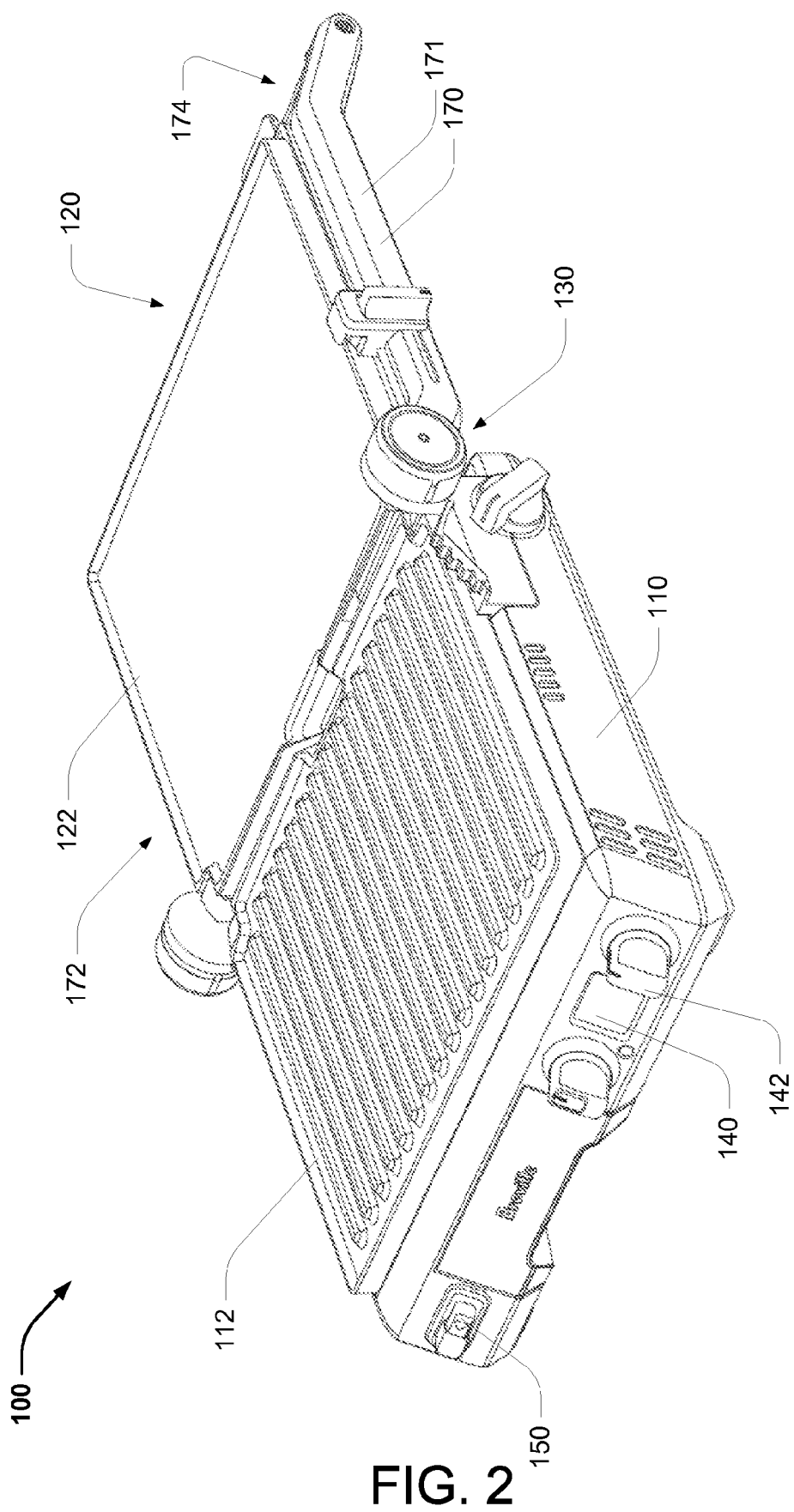
FIG. 2 is a perspective view of the apparatus according to FIG. 1A, shown in a fully open operative position for use as a grill.

In an embodiment, the handle is adapted to make contact with a bench or counter top so as to support the upper housing in the fully open grill configuration (as shown in FIG. 2). The upper housing and the upper cooking plate are restrained from pivoting when in this fully open grill position.

Figure 3A:
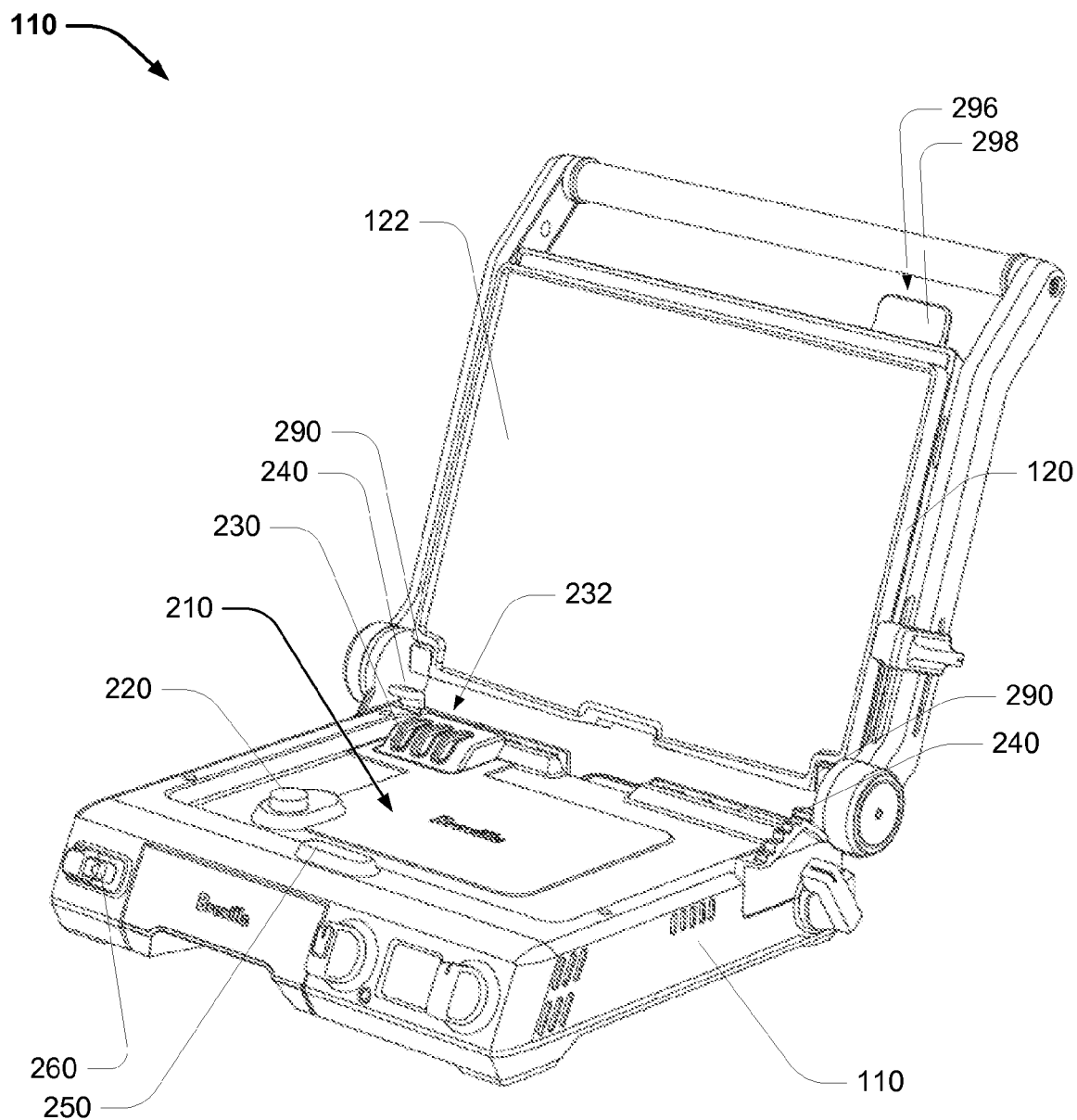
FIG. 3A is a perspective view of the apparatus according to FIG. 1A, shown with the lower plate removed.

This apparatus is adapted to function as a sandwich toasting press and a meat grill, and can be opened from a fully closed position to a full open grill position (as best shown in FIG. 1A, FIG. 2, and FIG. 3A).

A temperature control set point can be set by a rotating temperature control knob 142, located on a control panel of the lower housing. In an embodiment, the cooking temperature of the lower cooking plate and upper cooking plate are independently controllable, whereby the set cooking temperature of the upper cooking plate or lower cooking plate is set by a respective rotating one or more temperature control knobs.

This apparatus 100 has many of the external appearance attributes of a sandwich press. It comprises a lower housing 110 with a lower cooking plate 112, and an upper housing 120 with an upper cooking plate 112. In this embodiment, the lower cooking plate is shown as having a ribbed cooking surface, although it may also be provided with a flat cooking surface. It will be appreciated that, as the lower and upper cooking plates are adapted to be releasably engageable from their respective housing, different plate configurations are possible. Further, as the lower and upper plates have the same engagement configuration, they are interchangeable and may be swapped.

In this embodiment, the upper housing 120 (and upper cooking plate 122) may be positioned into a number of different cooking orientations with respect to the lower housing (and lower cooking plate 112). The upper housing 120 and lower housings 110 can be locked together for storage purposes. The upper housing 120 can be spaced apart from and above the lower housing 110 in a number of discreet steps. In these cooking and toasting configurations, the upper cooking surface will tend to remain generally parallel with a lower cooking surface. However, the pivot allows it to accommodate irregularly shaped foods. The upper housing 120 can be provided with an adjustment handle 162, which can be used to manipulate or position the tilt angle of the upper housing and respective cooking plate. In this embodiment, the adjustment handle 162 is integrally formed with the second lock release 160.

Figure 18:
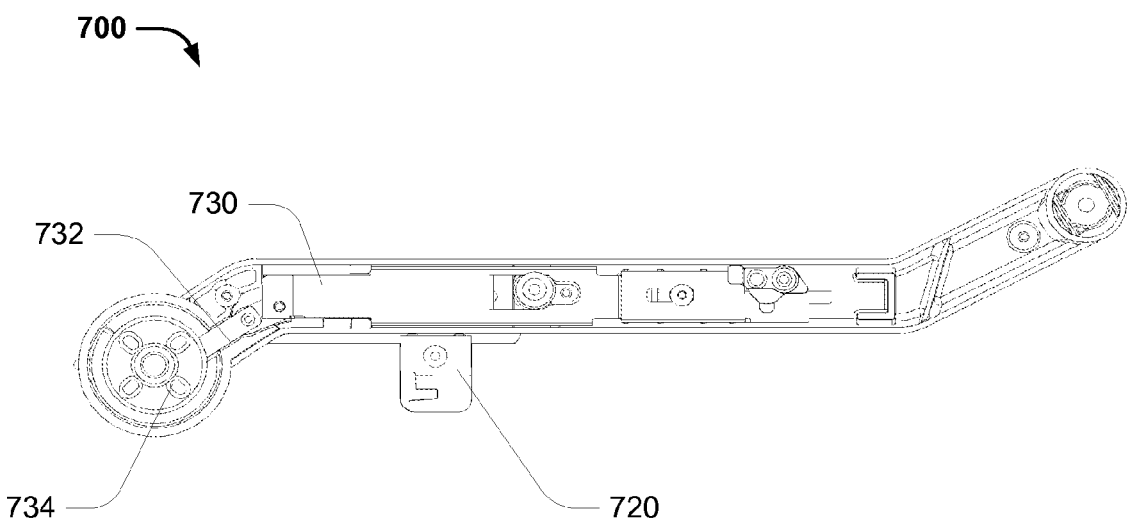
FIG. 18 is a partial side view of the hinge assembly.

In an embodiment the upper housing can be opened to an intermediate point where it rests against stops located within the hinge assembly (as shown in FIG. 18 and FIG. 19). The apparatus can also assume a fully open grill orientation primarily for higher temperature cooking (as shown in FIG. 2). In this orientation, higher temperatures can be used to cook meats, eggs and other foods that would normally be fried or grilled. This orientation can be achieved by manually deactivating a locking assembly operatively associated with the hinge assembly. In this open grill orientation, the handle 174 of the 'U' shaped arm serves as a foot, by making contact with the bench or counter top to thereby support the upper housing. In an embodiment, the handle may be slightly bowed or curved so that it makes contact in its centre. It should be noted that in the open grill orientation, the upper housing and its upper cooking surface are effectively immobilised.

Figure 3B:
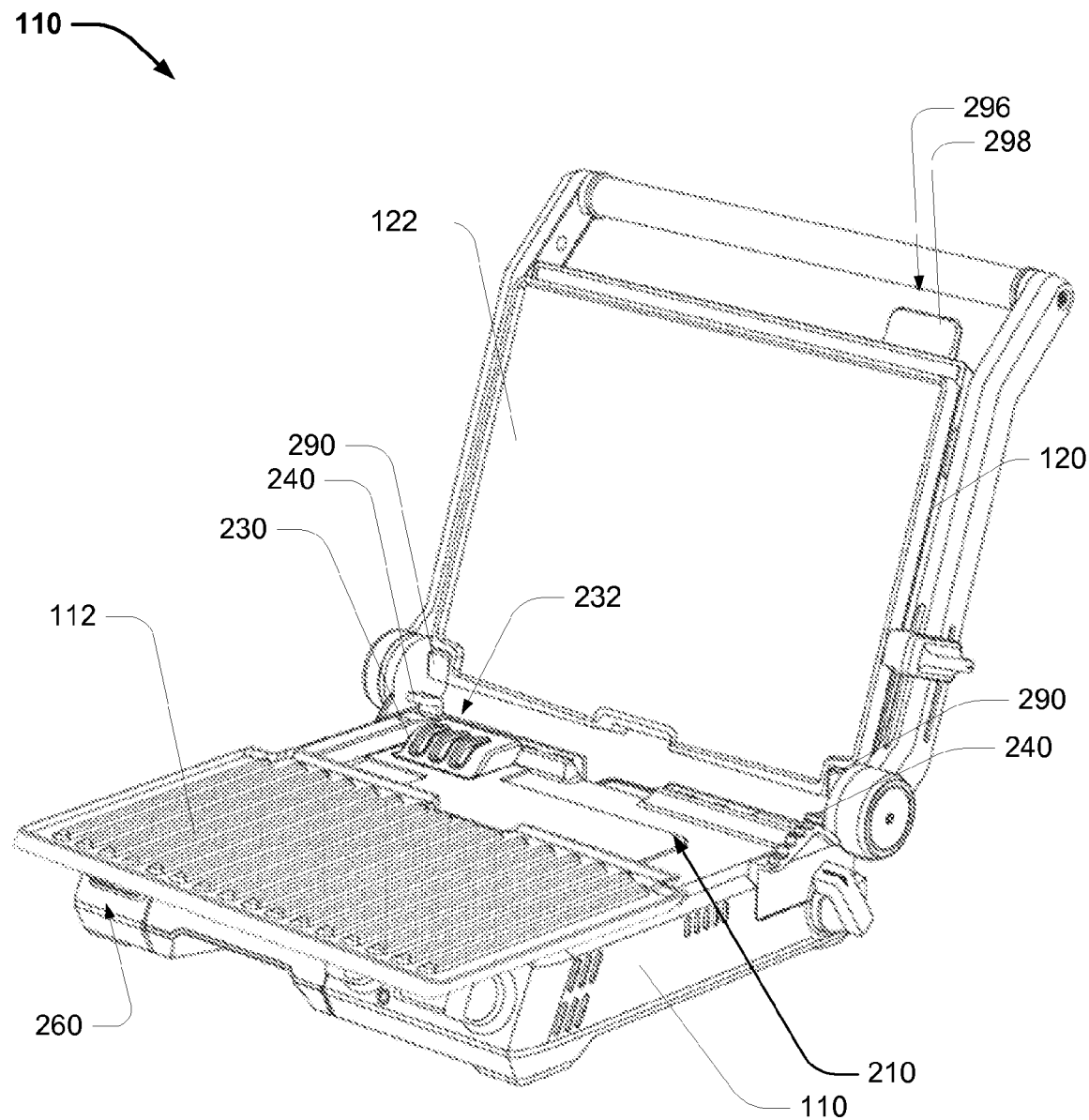
FIG. 3B is a perspective view of the apparatus according to FIG. 1A, shown with the lower plate being slid into engagement with the lower housing.

Referring to FIG. 3A, the lower housing 110 has a recess portion 210 for receiving a releasably engageable lower cooking plate 112 (as shown in FIG. 3B). However, in an alternative embodiment, it will be appreciated that the lower cooking plate could be received atop the lower housing, for example on a mount. The lower housing includes:
- a temperature sensor 220 adapted to be in thermal communication with an engaged lower cooking plate;
- a power coupling 230 for providing electrical power to a heating element of an engaged cooking plate, via electrical connectors 232;
- a pair of retaining brackets 240 for retaining an engaged cooking plate;
- a lock latch 250 for retaining an engaged cooking plate; and
- a lock release 260 for disengaging the lock latch and releasing an engaged cooking plate.

In this embodiment, it will be appreciated that the upper housing 120 is similarly configured for receiving a releasably engageable upper cooking plate 122. In this embodiment, a pair of retaining brackets 290 cooperate with a lock latch (not shown) to retain an engaged cooking plate 122. A lock release 296 is integrally formed with the adjustment handle 298, for releasing an engaged upper plate.

FIG. 3B shows a lower housing 110 releasably engaging a lower cooking plate 112 as the cooking plate slides in the direction of the power coupling 230.

Figure 4:
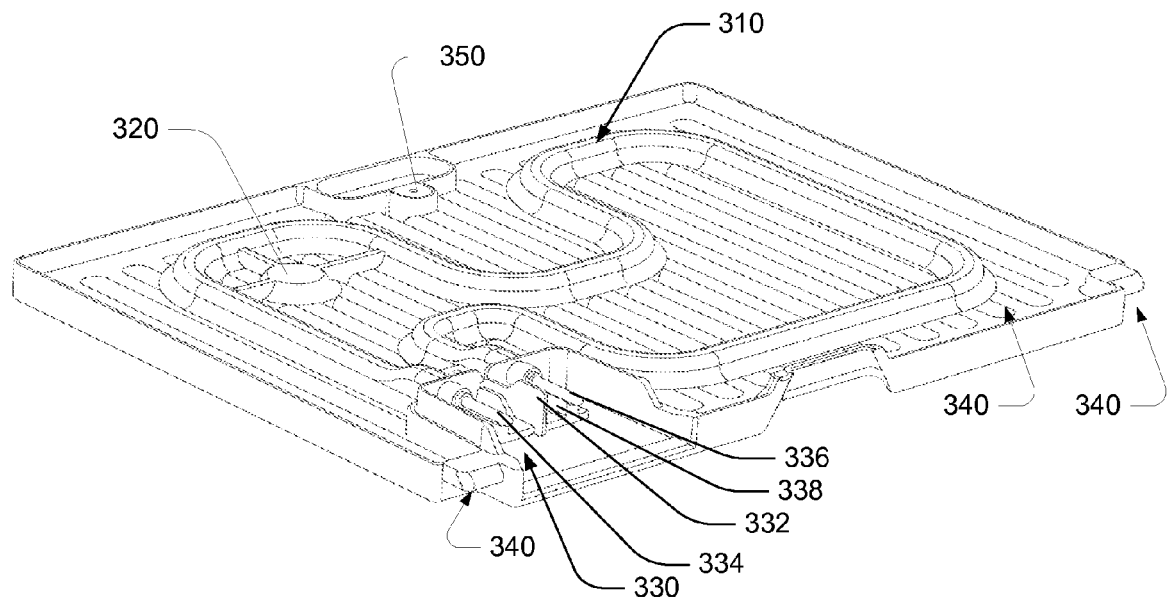
FIG. 4 is a perspective view of the under side of a cooking plate.

FIG. 4 shows the underside of an example embodiment cooking plate 300, which may be used as a lower plate 112 or upper plate 122. This cooking plate includes:
- a heating element 310 for heating the cooking plate;
- an abutment surface 320 for facilitating thermal communication with an engaged temperature sensor;
- a plurality of electrical contact elements 330 for receiving electrical power to the heating element;
- a pair of niches 340 for respectively engaging a pair of retaining brackets to retain the plate within the recess of a housing; and
- a locking clip 350 for engaging with a lock latch to retain the plate within the recess of the housing.

Figure 6:
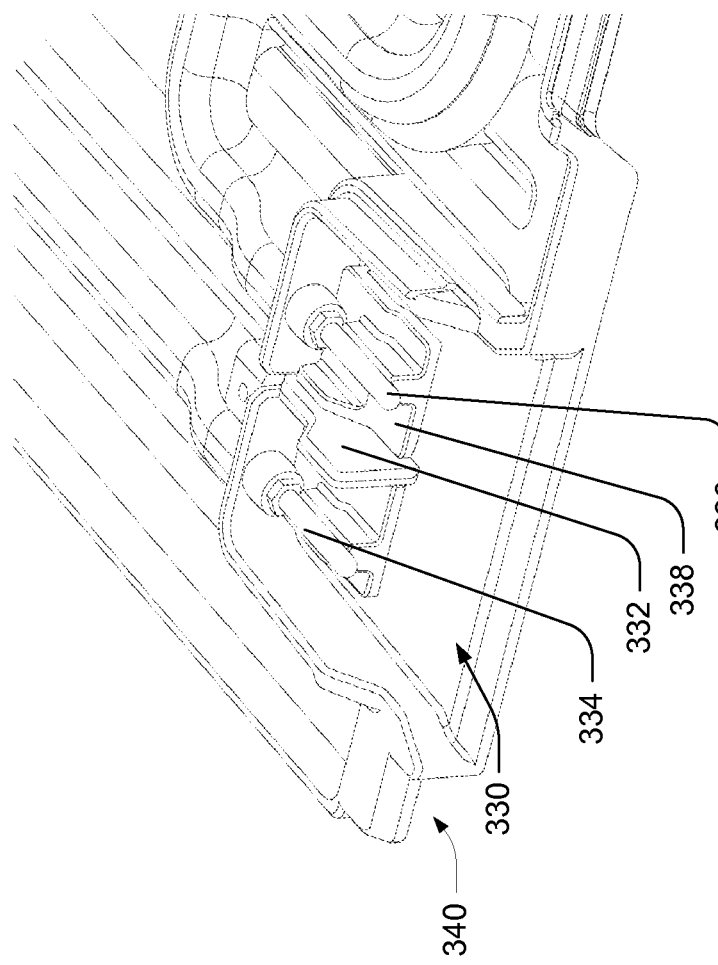
FIG. 6 is an enlarged partial perspective view of a cooking plate, showing a plurality of electrical contact elements.
Figure 7:
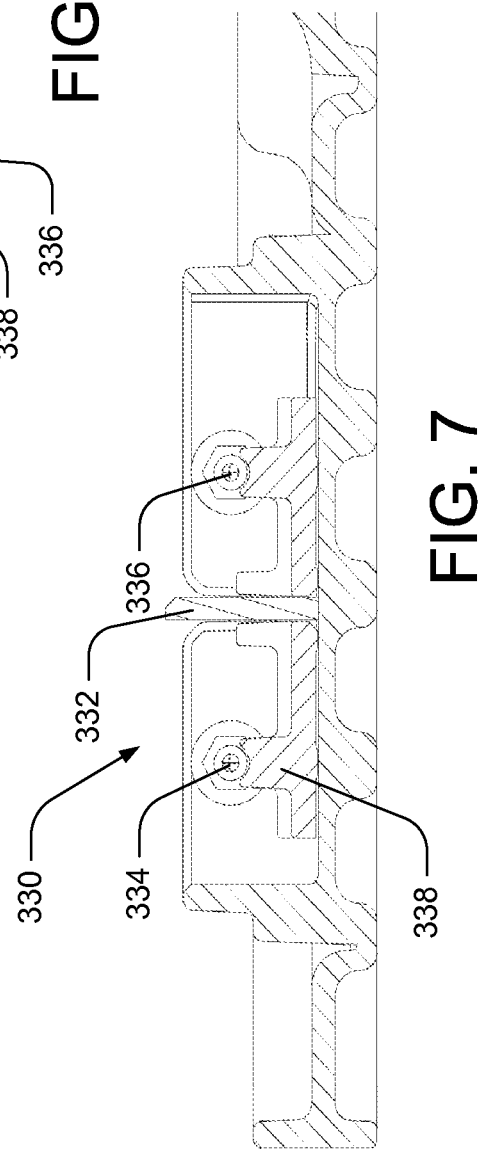
FIG. 7 is an enlarged partial sectional rear view of a cooking plate, showing a plurality of electrical contact elements.

In this example embodiment, the plurality of electrical contact elements 330 comprise a spade connector 332 for coupling ground, and a pair of stud connectors 334,336 for coupling active an neutral of an alternating current power source. It will be appreciated that, in other embodiments, a direct current power source can be used, and the stud connectors would be adapted to couple a positive and negative voltage. It is preferred that a ground connection is established first, which is achieved in this apparatus by having the spade connector 332 extend further than the stud connectors. A support element 338 may be located between the pair of stud connectors 334,336 and the plate to support the connectors as they engage the power coupling. The support element can also provide lateral support to the spade connector 332 (as best shown in FIG. 6 and FIG. 7).

When a housing engages the cooking plate:
- an electrical connection is established between the power coupling and a plurality of electrical contact elements on the cooking plate for providing electrical power to a heating element of the cooking plate;
- a thermal communication is established between the a temperature sensor and an abutment surface of the cooking plate for enabling the temperature of the plate to be sensed;
- a restraining engagement is established between a pair of retaining brackets of the housing and a respective pair of niches on the cooking plate; and
- a releasable locking engagement is established between a lock latch of the housing and a lock clip of the cooking plate.

It will be appreciated that, by providing electrical contact elements on the underside of the cooking plate, the full cooking surface can be utilised. Further, by positioning the power coupling proximal to the hinge assembly but on the opposite side of the upper housing compared to the lower housing, the plates may be interchangeable while still draining though the middle.

Figure 5:
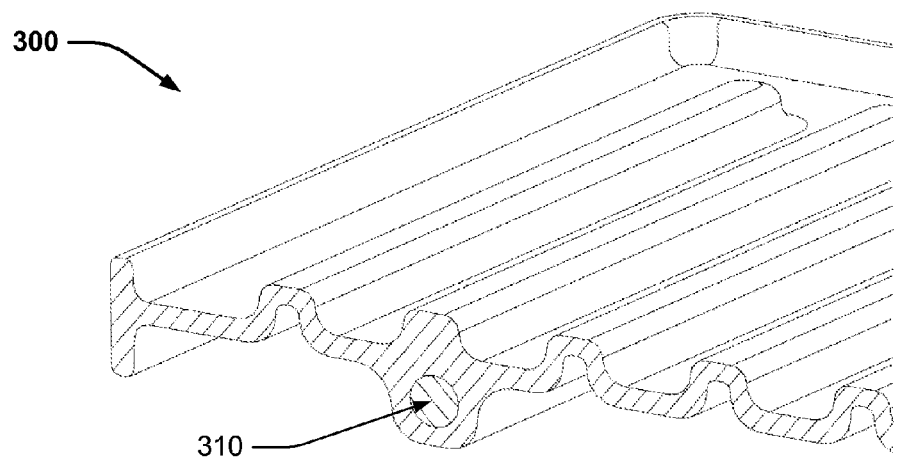
FIG. 5 is a partial sectional perspective view of the cooking plate of FIG. 4, showing an integrated heating element.

FIG. 5 shows an example embodiment of a heating element 310 integrally formed with the cooking plate 300. The heating element is formed within the casting of the cooking plate. It will be appreciated that arrangement can enable heat to be absorbed into the plate. It will be appreciated that, in alternative embodiments, that heating element can be mounted to the underside of the cooking plate.

The layout of the heating element can also assist in providing a more even heat distribution. For example, the path taken by the heating element 310 can be established such that the distance between adjacent parallel portions is approximately constant, and that the distance between the edge of the cooking plate 300 and the closest portion of the heating element is about half of the distance between adjacent parallel portions. This provides that each portion of the heating element is primarily responsible for radiating heat about the same distance.

In an embodiment, the layout of the heating element can also assist in providing a more even heat distribution by:
- positioning the heating element such that opposing portions of the heating element substantially maintain a predetermined distance apart; and
- positioning the heating element such that the distance between the edge of the cooking plate and portions is substantially half the predetermined distance.

In this example embodiment, the upper cooking plate and lower cooking plate are removably interchangeable. Each cooking plate can comprises a grill cooking surface having ribs that are positioned parallel with the sides of the device. In this example the ribs are of constant height. However it will be appreciated that in alternative embodiments, the ribs may be tapered, being higher at a front than at a rear, this allowing a tip of a rib to remain generally horizontal while still providing drainage of an inclined surface that occupies a space between and around the ribs. Alternatively, a cooking plate can comprise a substantially flat cooking surface. Run off is deposited into a drip tray carried by the lower housing, and collecting from the centre of each cooking plate.

Figure 8A:
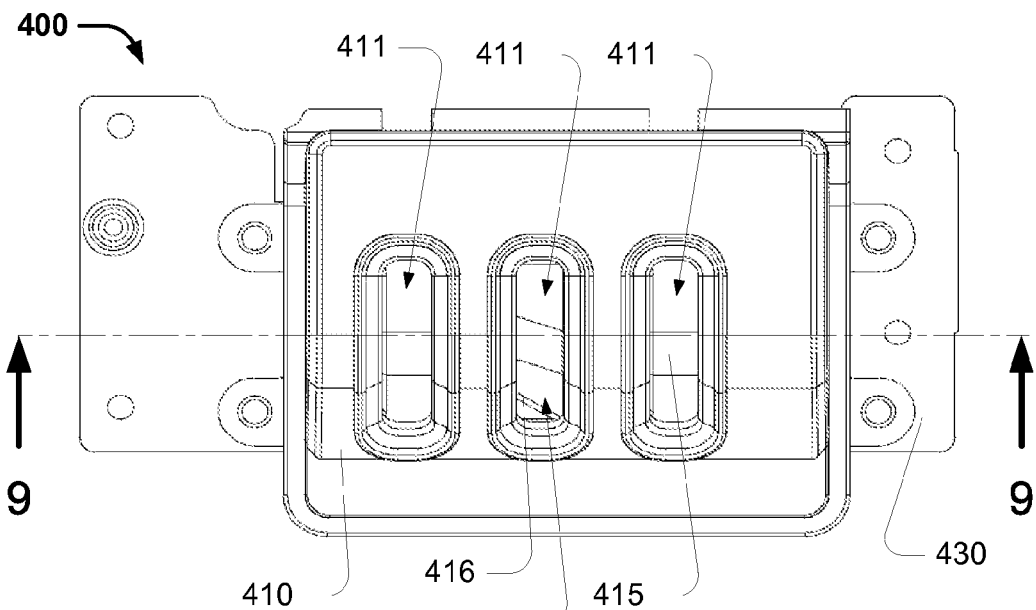
FIG. 8A is a plan view of a power coupling.
Figure 8B:
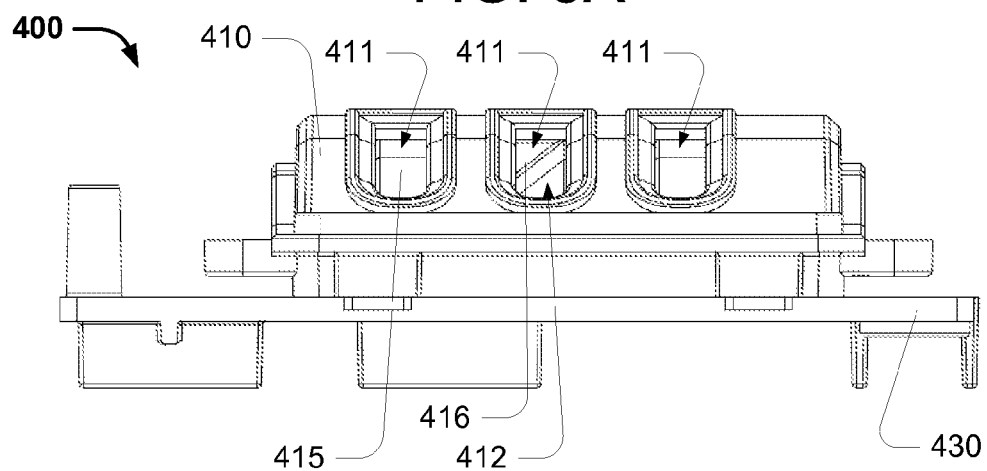
FIG. 8B is a front view of the power coupling of FIG. 8A.
Figure 8C:
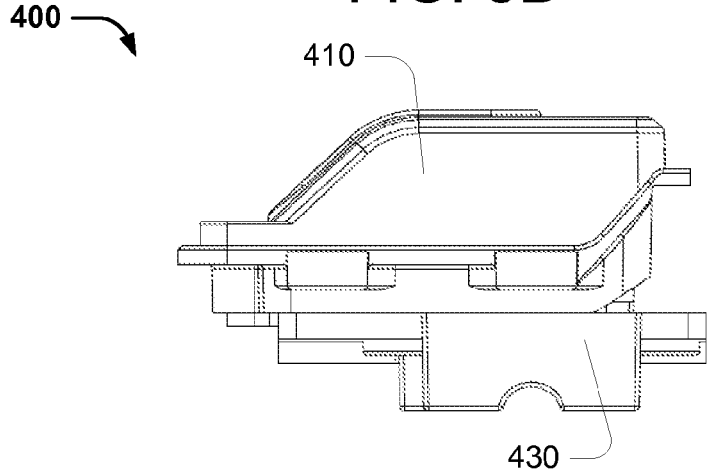
FIG. 8C is a side view of the power coupling of FIG. 8A.
Figure 9:
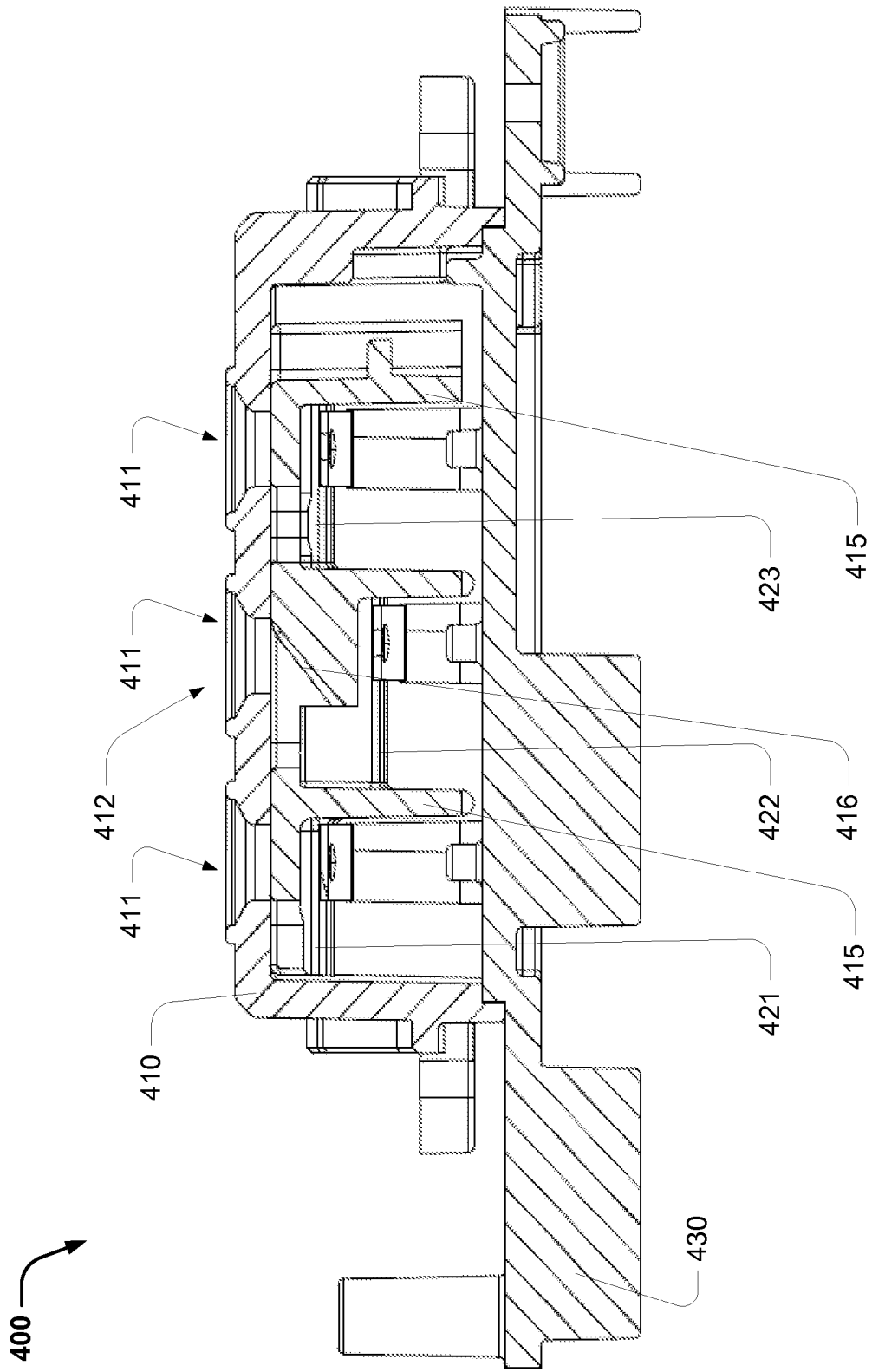
FIG. 9 is a sectional view of the power coupling of FIG. 8A, taken along line 9-9.
Figure 10:
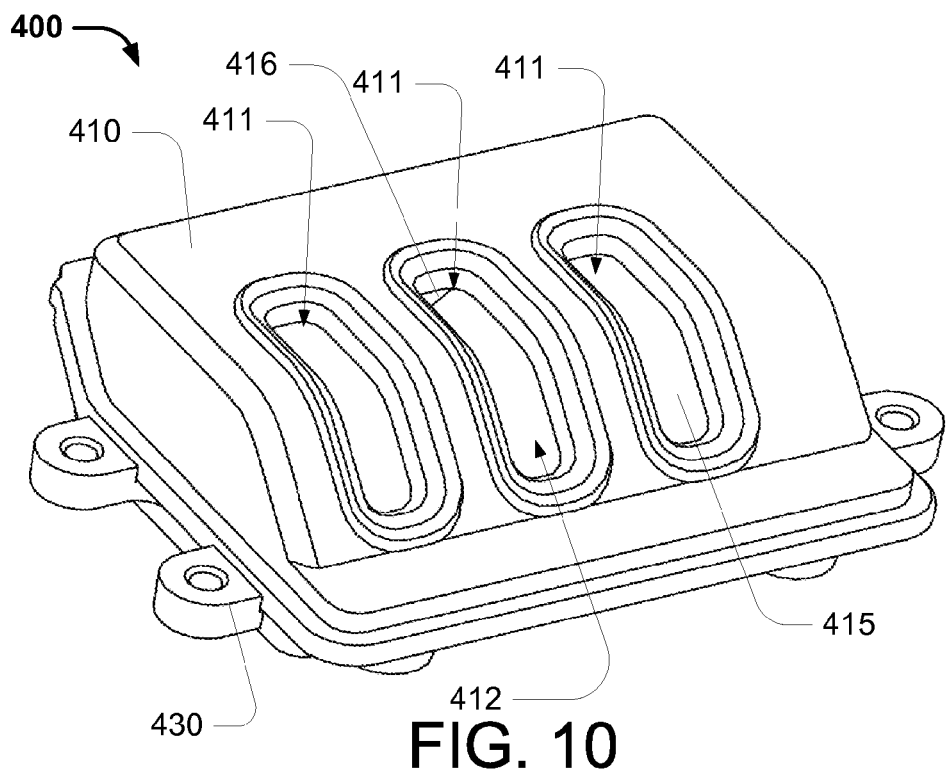
FIG. 10 is perspective view of the power coupling of FIG. 8A, showing the upper side.
Figure 11:
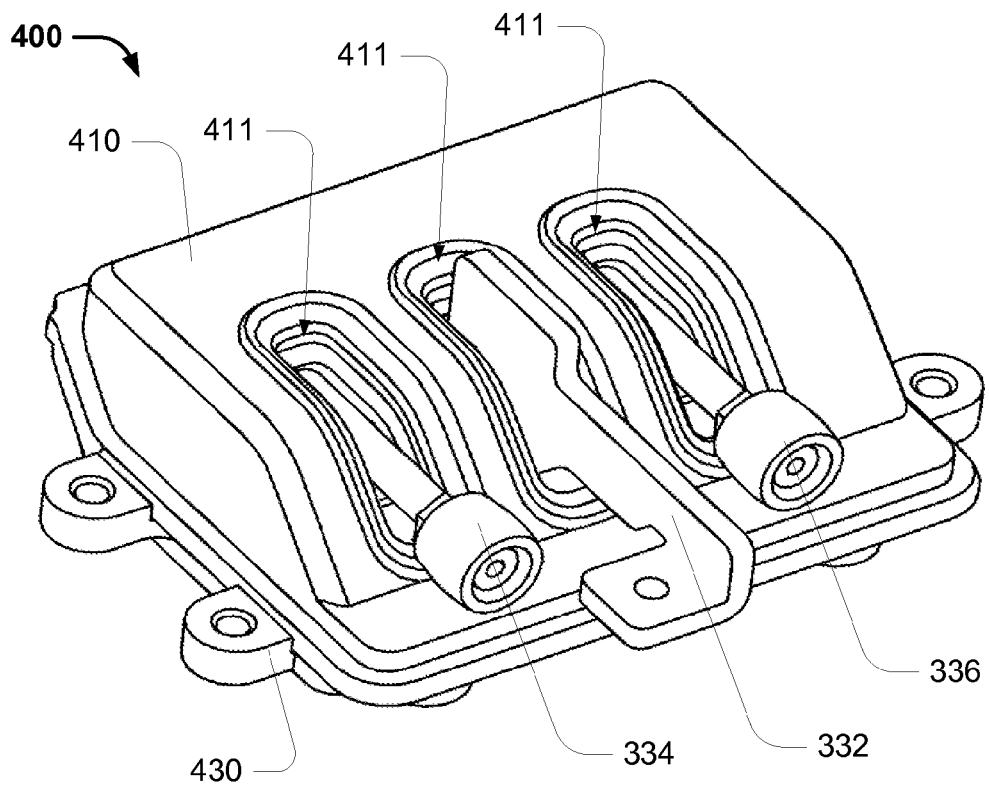
FIG. 11 is perspective view of the power coupling of FIG. 8A, showing an electrical connection established between the power coupling and a plurality of electrical contact elements.
Figure 12:
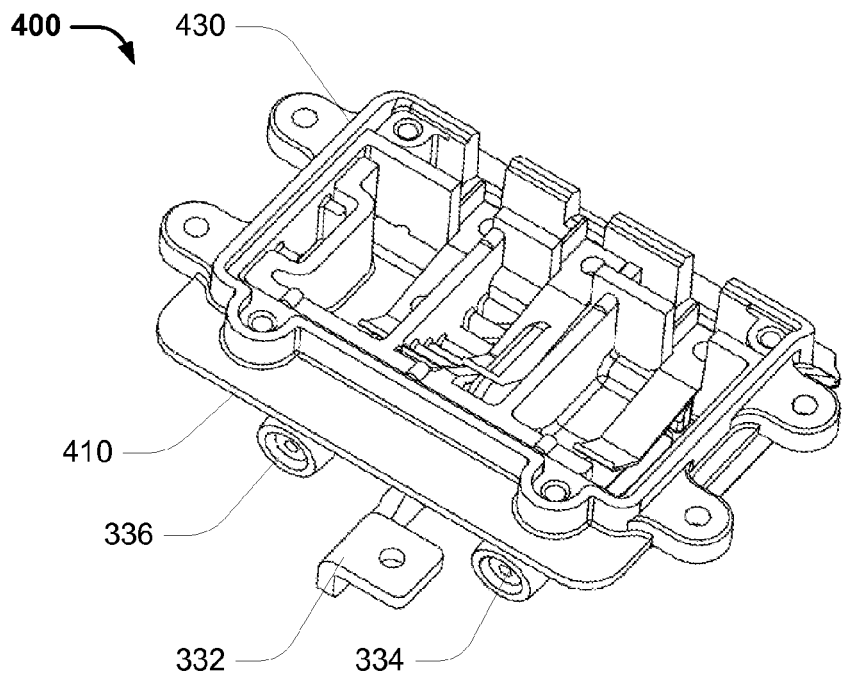
FIG. 12 is perspective view of the power coupling of FIG. 8A, showing the under side with an electrical connection established between the power coupling and a plurality of electrical contact elements.
Figure 13A:
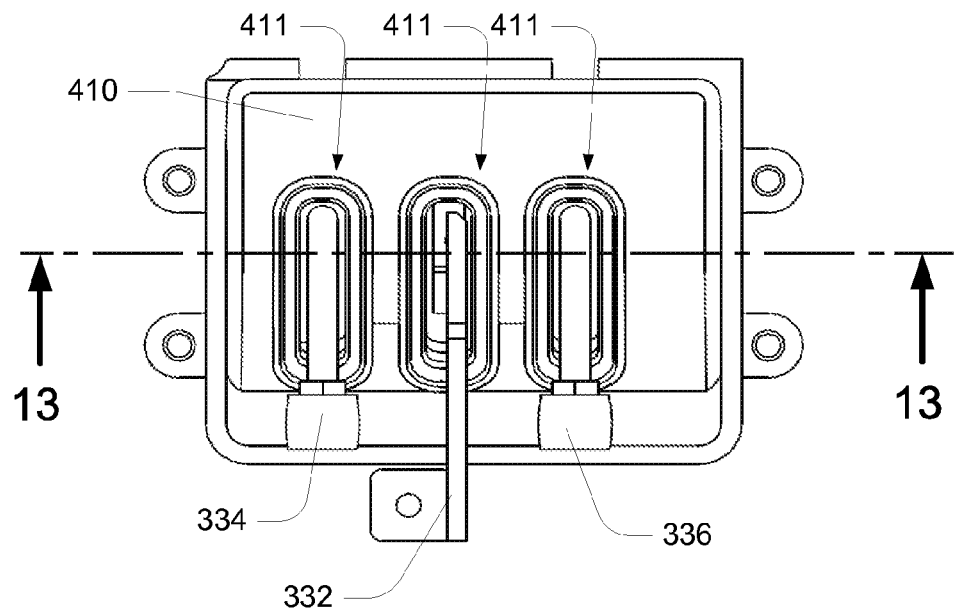
FIG. 13A is plan view of the power coupling of FIG. 8A, showing the upper side, showing an electrical connection established between the power coupling and a plurality of electrical contact elements.
Figure 13B:
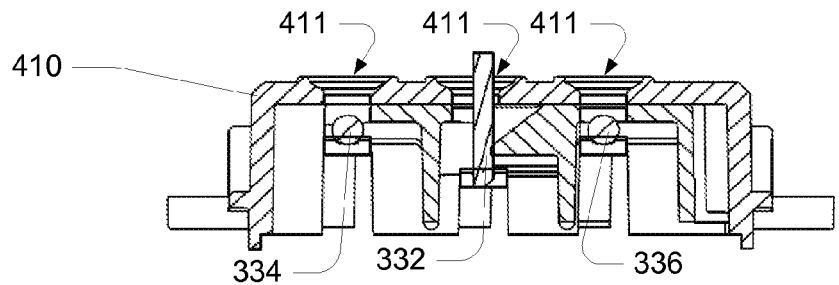
FIG. 13B is sectional front view of the power coupling of FIG. 13A, taken along line 13-13.

FIGS. 8A through 8C respectively show a plan, front and side view of a power coupling 400, which is adapted to provide electrical power to a heating element of an engaged cooking plate. This power coupling can be the power coupling 230 of the lower housing or a power coupling of the upper housing. FIG. 9 shows a sectional view of the power coupling 400, taken along line 9-9 of FIG. 8A.

In an embodiment, the power coupling 400 comprises an upper cover 410 and a backing element 430. The upper cover includes three apertures 411 for each receiving a respective electrical contact element on the cooking plate. A slidable guard 415 is included, and biased toward a closed position to restrict access to the electrical contacts of the of the power coupling. This guard provides a measure of safety and limits foreign material entering the power coupling while a cooking plate is not installed. The guard has an inclined abutment surface 416 for enabling a partially received electrical contact element on the cooking plate to abut the surface and simultaneously slidably moves the guard toward the open position as the plate is being installed. Alternatively, the guard may be moved by other direct application of force toward the abutment surface from the cooking plate during installation.

In this embodiment, the centre aperture 412 exposes the abutment surface 416 of the guard 415 and is intended to receive a ground connecting element (in the form of a spade connector). The guard is automatically slidably movable in co-operation with receiving a electrical contact element of the respective heating element. The guard is automatically slidably movable in co-operation with receiving an electrical contact element for coupling a ground connection.

This power coupling 400, with the guard in the open position, enables access to three resiliently biased electrical contact tabs 421, 422, 423 for each establishing an electrical connection with a respective electrical contact element on the cooking plate. As the cooking plate is moved into a locked position, each electrical contact element (for example 334, 332 and 336 of FIG. 4) comes into direct contact with respective tabs 421, 422, 423 (as shown in FIG. 11, FIG. 12, FIG. 13A and FIG. 13B). This contact deflects the tab, such that the resilient bias of the contact tab provides a sufficient contact force to maintain an electrical connection.

It is preferred that a ground connection is made prior to the active or neural. It will be appreciated that this can be achieved by adjusting the relative lengths and/or position of the contact tabs and/or electrical contact elements.

In an embodiment, the lower housing 110 and upper housing 120 each include a power coupling for providing electrical power to a heating element of a respective engaged cooking plate. Each power coupling defines three power socket elements, adapted to receive a co-operative electrical contact element of the respective heating element. The three socket elements couple a ground connection and two power connections for providing electrical power to the respective heating element. When the heating element (and therefore the cooking plate) is not engaged with the housing a guard shields each of the power socket elements.

In an embodiment, the lower housing and upper housing each include a temperature sensor adapted to be in thermal communication with an engaged cooking plate.

Figure 14:
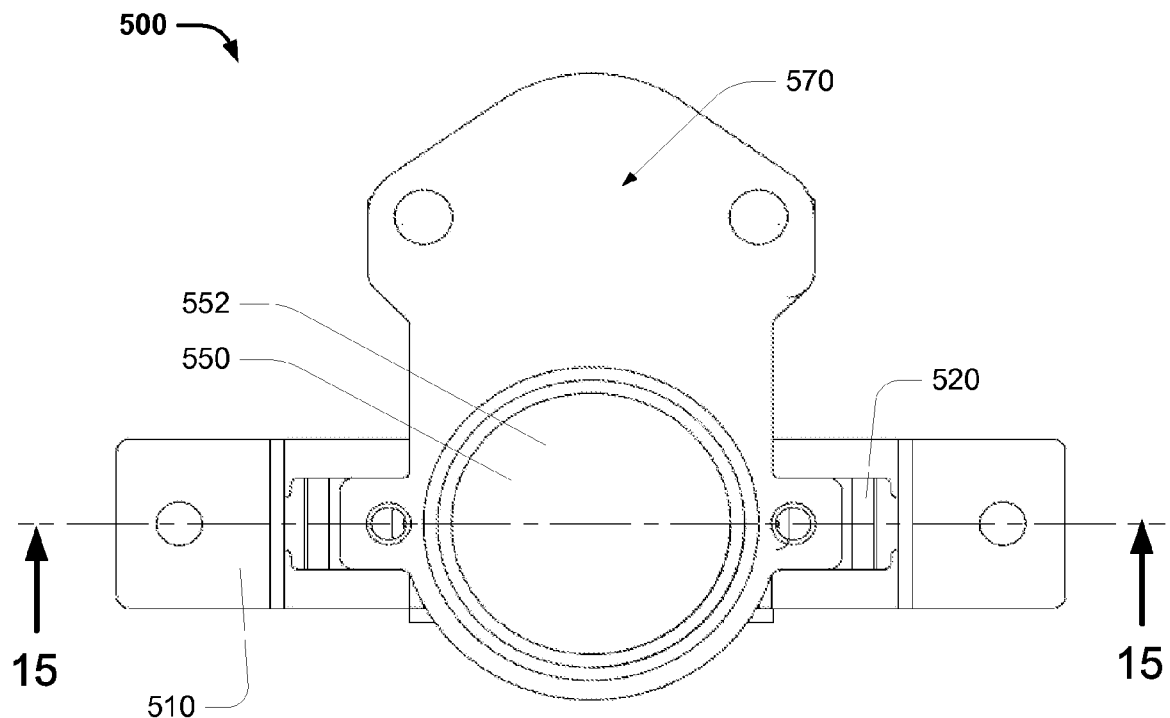
FIG. 14 is a top view of a temperature sensor.
Figure 15:
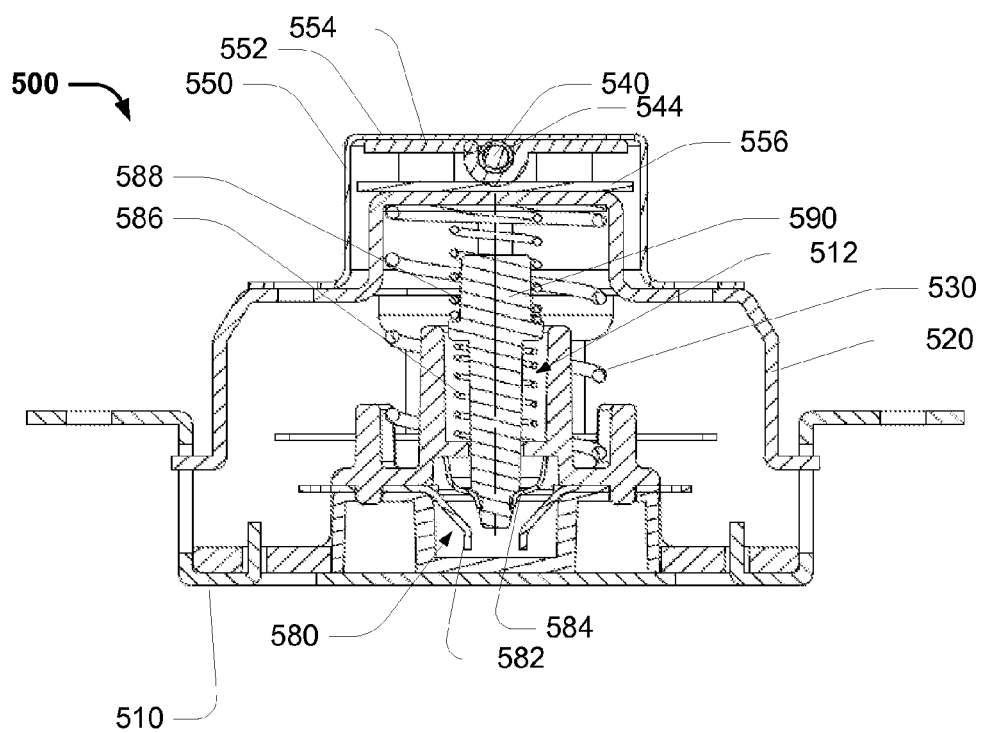
FIG. 15 is a section view of the temperature sensor of FIG. 14, taken along line 15-15.
Figure 16:
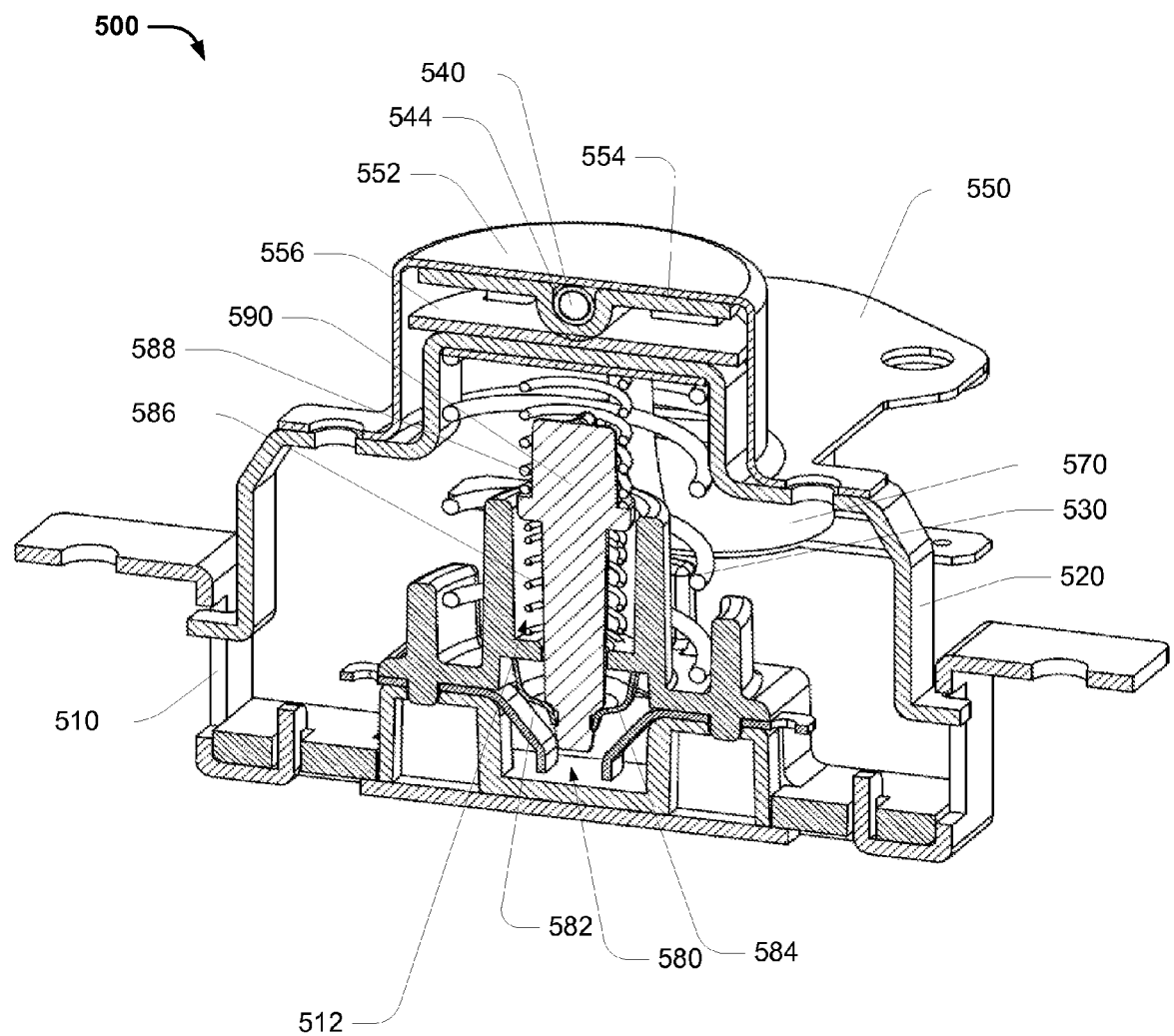
FIG. 16 is perspective section view of the temperature sensor of FIG. 14, taken along line 15-15.

FIG. 14, FIG. 15 and FIG. 16 show an example temperature sensor 500 adapted to be in thermal communication with an engaged cooking plate. This temperature sensor is biased to abut a respective engaged cooking plate for providing thermal communication.

The temperature sensor 500 includes:
  a base element 510 for mounting the temperature sensor to the housing;
  a bracket element 520 that is movable with respect to the base element;
  a bias element 530, in the form of a spring, for biasing the temperature sensor toward abutting engagement with a respective engaged cooking plate;
  a thermistor 540, for providing a temperature signal to the temperature controller that is indicative of the temperature of the respective cooking plate.

The thermistor 540 is covered by a cap 550 having an abutment surface 552 for abutting a corresponding abutment surface 320 on a cooking plate (not shown). A thermally conductive insert 554 is further provided to surround the thermistor and thereby assist thermal coupling of the thermistor to a cooking plate. The cap 550 and conductive insert 554 are preferably made of a thermally conductive material such as aluminium, copper or brass. The thermistor is sleaved in silicone to provide electrical and mechanical protection. A mica layer 556 is used to provide some electrical and thermal insulation for the components below the bracket element 520, thereby to better enable use of plastics components.

The thermistor provides a temperature signal to the temperature controller that is indicative of the temperature of the respective cooking plate. In this embodiment the apparatus 100 comprises a temperature sensor 500 in each of the lower housing and upper housing. The temperature controller receives temperature signal from each of the lower housing and upper housing to control the temperature of the respective cooking plate and the upper cooking plate with respect to at least one temperature set point signal.

In this example embodiment, the temperature sensor 500 further includes:
  a thermostat 570 adapted to disconnect the electrical supply to the power coupling in the event of over-heating of the respective cooking plate;
  a pressure sensitive disengagement switch 580 adapted to disconnect the electrical supply to the power coupling when the respective cooking plate is not engaged to the housing.

The thermostat 570 is a conventional bi-metallic switch that is coupled to a relay for disconnecting the electrical supply to the power coupling in the event of over-heating of the respective cooking plate. It will be appreciated that this provides a thermo-mechanical circuit breaker in the event of over-heating of the respective cooking plate, which is independent of the temperature controller.

The pressure sensitive disengagement switch 580, comprised two contact elements 582 and 584. This switch is biased in the open by springs 586 and 588. The contact 584 is mounted at one end of a shaft 590 which is suspended by the springs 586 and 588. As pressure is applied to the abutment surface 552, spring 588 pushes against the bias of spring 586 to move the shaft such that elements 582 and 584 are brought into contact. It will be appreciate that the relative compression strength of the springs 586 and 588 are selected such that the switch closes as the plate is brought into sufficient contact with the abutment surface 552. In this example, the pressure sensitive switch is coupled to a relay for disabling power the device when the plate is removed.

By way of example only, the travel of the shaft 590 is contained within a recess 512 of the base 520. The relative compression strength of the springs 586 and 588 enable the switch to close as the plate is brought into sufficient contact with the abutment surface 552, without direct engagement with the bracket element 520. In an alternative embodiment, the bracket element 520 can directly apply force to the shaft 590 for bringing the elements 582 and 584 into contact to thereby closing the switch.

It will be appreciated that in this example configuration of the temperature sensor 500, much of the components can be assembled vertically from the top (with reference to FIG. 15). This can enable a more efficient, and cost effective, manufacture of the temperature sensor 500.

Figure 17:
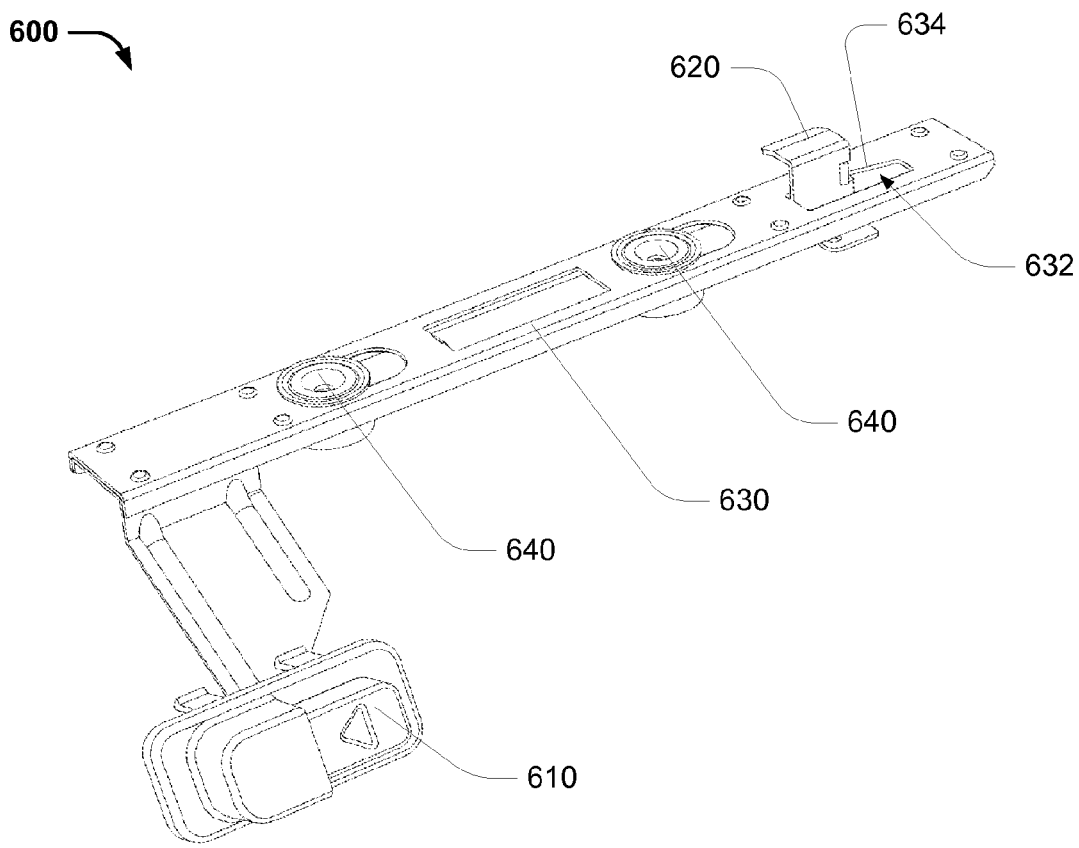
FIG. 17 is perspective view of a locking assembly for providing releasable locking engagement between a housing and a cooking plate.

FIG. 17 shows an example lock release assembly 600 comprising a lock release 610 for disengaging the lock latch 620 and thereby releasing an engaged cooking plate. The lock release 610 is coupled to a release arm 630 having an aperture 632 that defines an inclined abutment surface 634. The arm is slidably mounted to a housing (for example a lower housing or upper housing) by guides 640. Sliding movement of the lock release 610 causes a corresponding sliding movement of the arm 630, thereby bringing the surface 634 into abutting engagement with the lock latch 620. Further sliding movement of the lock release is translated to movement of the lock latch to thereby release an engaged cooking plate.

Figure 19A:
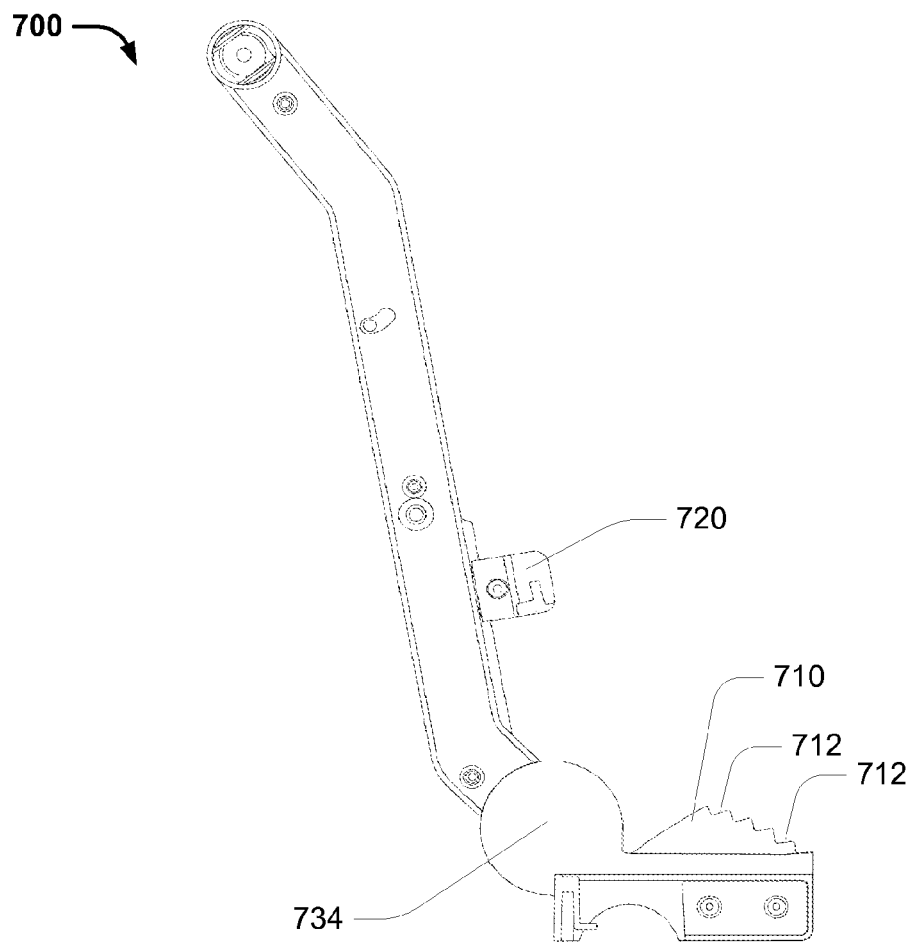
FIG. 19A is a partial side view of the hinge assembly.
Figure 19B:
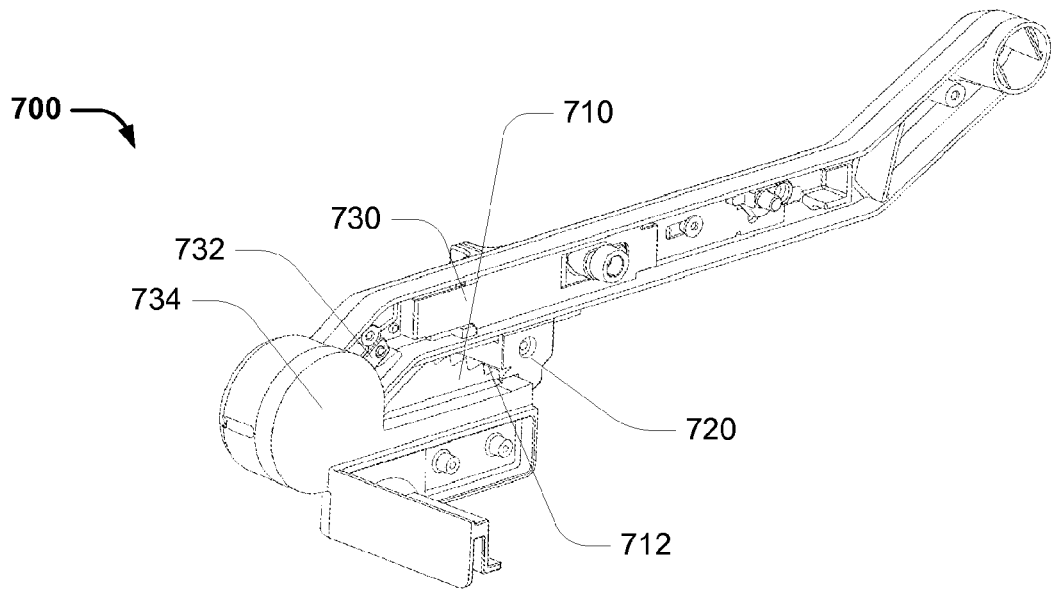
FIG. 19B is a partial perspective view of the hinge assembly of FIG. 19A, shown in the closed position.

FIG. 18, FIG. 19A and FIG. 19B show a partial side view of an example hinge assembly 700. This hinge assembly comprises:
- a height adjustment surface 710 for providing a plurality of detents (or stops) 712;
- a height adjustment slider 720, slidably mounted to the 'U' shaped frame, and adapted to engage at least one of the plurality of detents 712 for defining a selected height adjustment; and
- a hinge release 730 for releasing the 'U' shaped frame toward the fully open grill configuration (as shown in FIG. 2).

The height adjustment surface 710 and height adjustment slider 720 co-operate such that the upper housing can be spaced apart from and above the lower housing in a plurality of discreet steps. In an embodiment the upper housing can be opened to an intermediate point where it rests against stops located within the hinge assembly.

The hinge release 730 is coupled to a locking pin 732 operatively associated with an internal locking joint 734.

By way of example, the hinge assembly is at least partially concealed within a hinge between the 'U' shaped frame and the lower housing, and establishes the intermediate and locked orientation. The hinge release 730 defeats the intermediate and locked orientation so that the device can be opened to a fully open grill configuration (as shown in FIG. 2). The upper housing (and upper cooking plate) is restrained from pivoting when in the full open grill position. This hinge assembly is adapted to be reset without further intervention when the user closes the device, so that a subsequent attempt to open the unit encounters the intermediate and locked orientation.

The locking assembly can further enable the upper housing and lower housing to be locked together for storage purposes.

Figure 20:
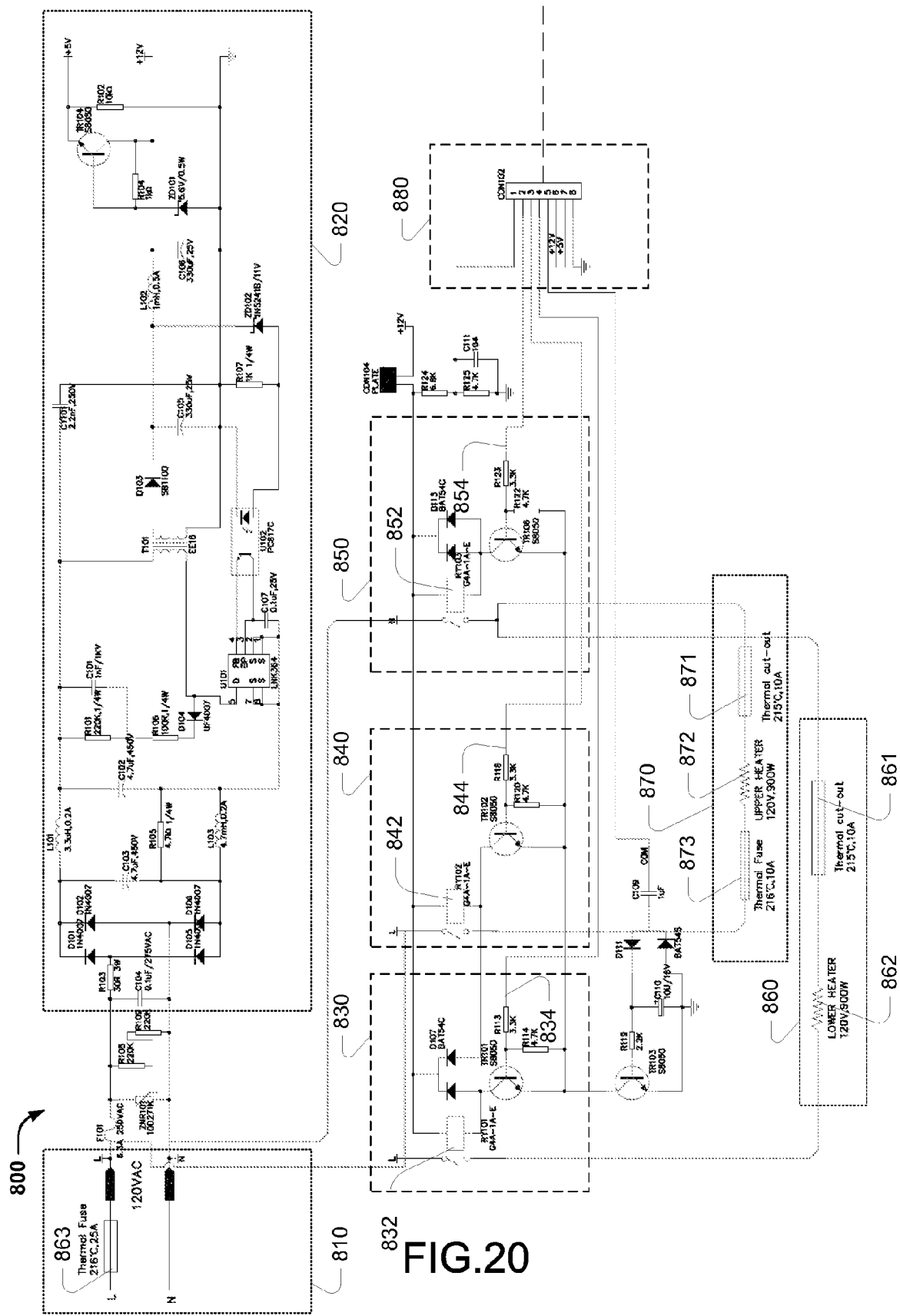
FIG. 20 is a schematic view of the electric circuit of the sandwich press and grill apparatus, showing the power circuit.

FIG. 20 shows an example schematic view of the power circuit 800 for a sandwich press and grill apparatus. The power circuit discloses a power connection 810 and a +5 volt and +12 volt regulated power supply 820 for powering the temperature controller. Circuits 830, 840 and 850 are adapted to switch respective relays 832, 842 and 852 via respective control signals 834, 844 and 854 from the temperature controller. Circuits 830 switches the active electrical power provided to the lower cooking plate (via a power coupling). Circuits 840 switches the active electrical power provided to the upper cooking plate (via a power coupling). Circuit 850 switches the neutral electrical power provided to both the lower cooking plate and upper cooking plate (via a power coupling).

Circuits 860 and 870 show the thermal cut-out (861 and 871) and heating element (862 and 872) associated with the lower cooking plate and upper cooking plate respectively. In this embodiment, the lower cooking plate is associated with a thermal fuse 863 electrically connected in series with the input power to the device, but physically coupled to the lower plate. In this arrangement failure of this fuse will result in the disconnection of power to the whole device. In this embodiment, the upper cooking plate also has an associated thermal fuse 873.

An interface 880 is provided for communicating signals and supply voltages between the power board and a control board.

Figure 21:
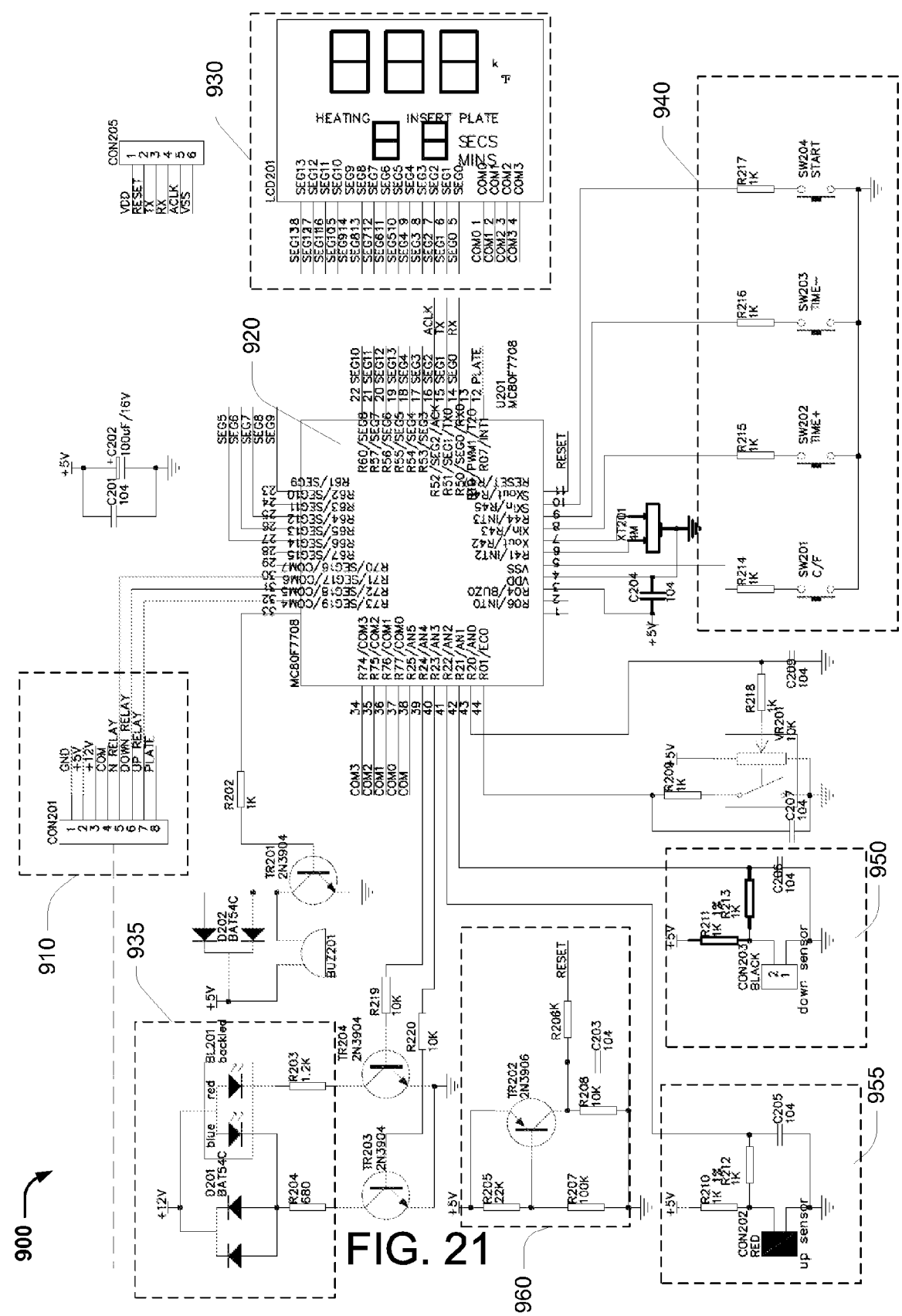
FIG. 21 is a schematic view of the electric circuit of the sandwich press and grill apparatus, showing the control circuit.

FIG. 21 shows an example schematic view of the control circuit 900 for a sandwich press and grill apparatus. The control circuit 900 comprises:
- an interface 910 for communicating signals and supply voltages between the power board and the control board;
- a processor 920 for executing code to control the temperature of the lower cooking plate and upper cooking plate;
- a display segment 930 and LEDs 935;
- a plurality of switches 940 for receiving user commands;
- thermistor temperature sensors 950 and 952 for the providing a temperature signal to the temperature controller processor that are indicative of the temperature of respective cooking plates.
- a reset circuit 960 for resetting the processor on power up.

Figure 22:
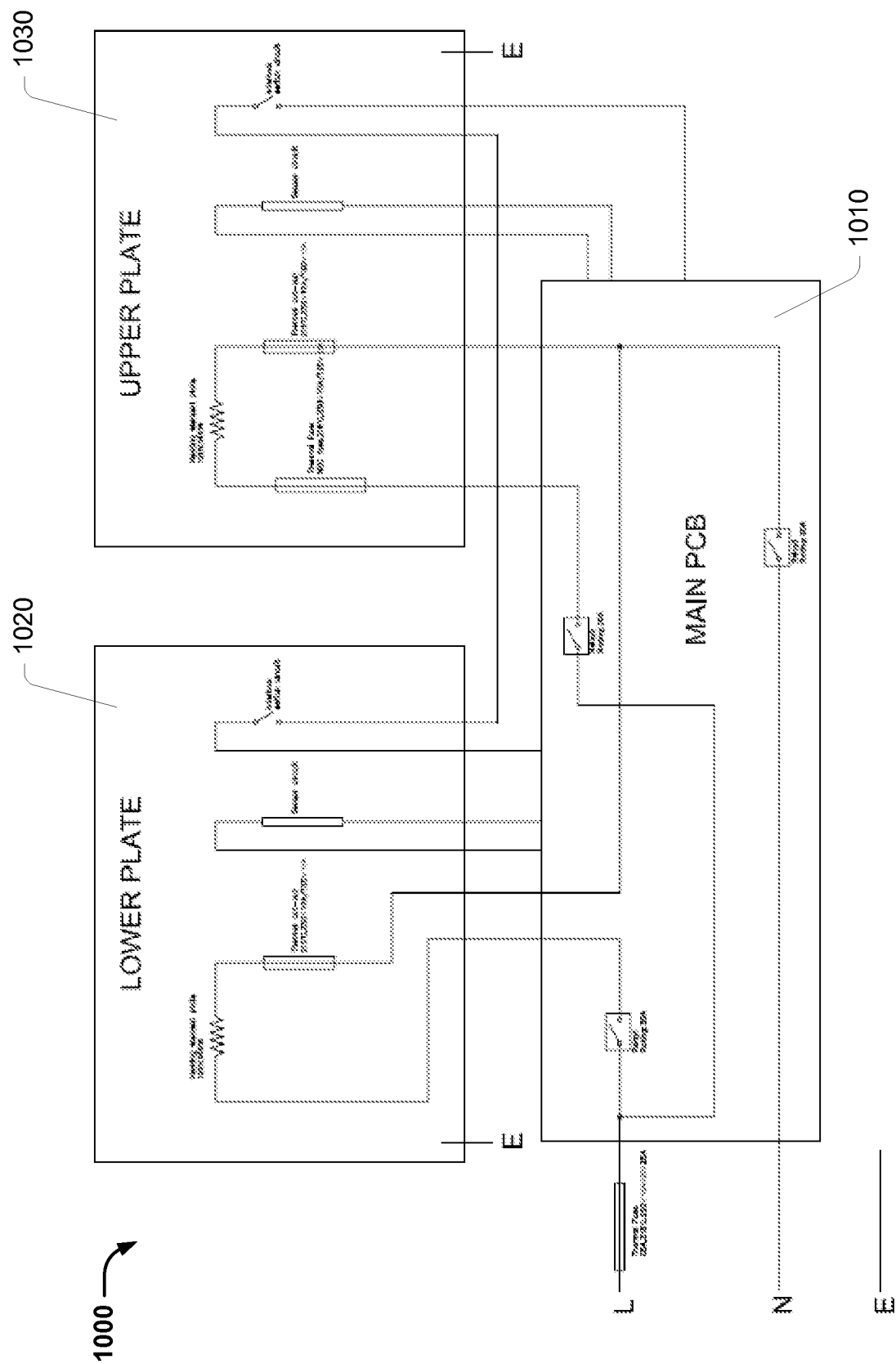
FIG. 22 is a schematic view of the electric circuit of the sandwich press and grill apparatus, showing the circuit associated with the connection of upper and lower cooking plates.

FIG. 22 is a schematic view of the electric circuit 1000 of the sandwich press and grill apparatus, showing the circuit associated with the connection between the main PCB 1010 and circuitry associated with the lower cooking plate 1020 and upper cooking plate 1030.

Patent Co-operation Treaty patent application having international publication number WO 2005/037035 A1, herein incorporated by reference, discloses further details that can be applied to the currently disclosed embodiments, regarding:
- hinge assemblies for establishing the intermediate and locked orientation;
- cooking surface tilt adjustment actuation; and
- cooking configurations.

Figure 23:
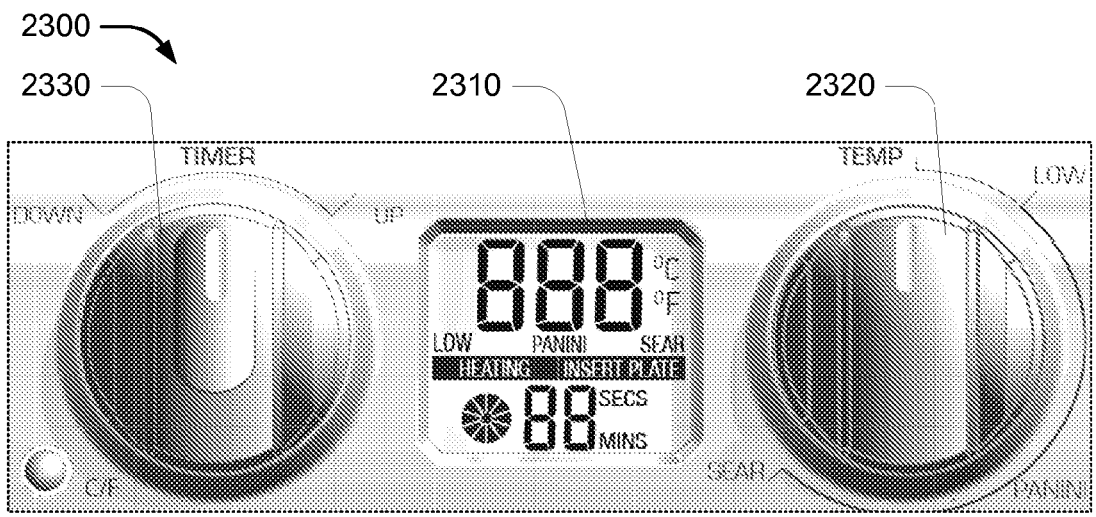
FIG. 23 is an embodiment control panel layout according to the invention.

An embodiment temperature controller can include a control panel layout 2300, as shown in FIG. 23. This example control panel layout 2300 can include a display element in the form of an LCD display element 2310, a temperature control dial 2320 and a timer control dial 2330.

It would be appreciated that, temperature control and timer control may be configured or set using a single dial. Therefore, one or more control dials can be included for enabling timer control and temperature control of the lower and/or upper cooking plate.

Figure 24:
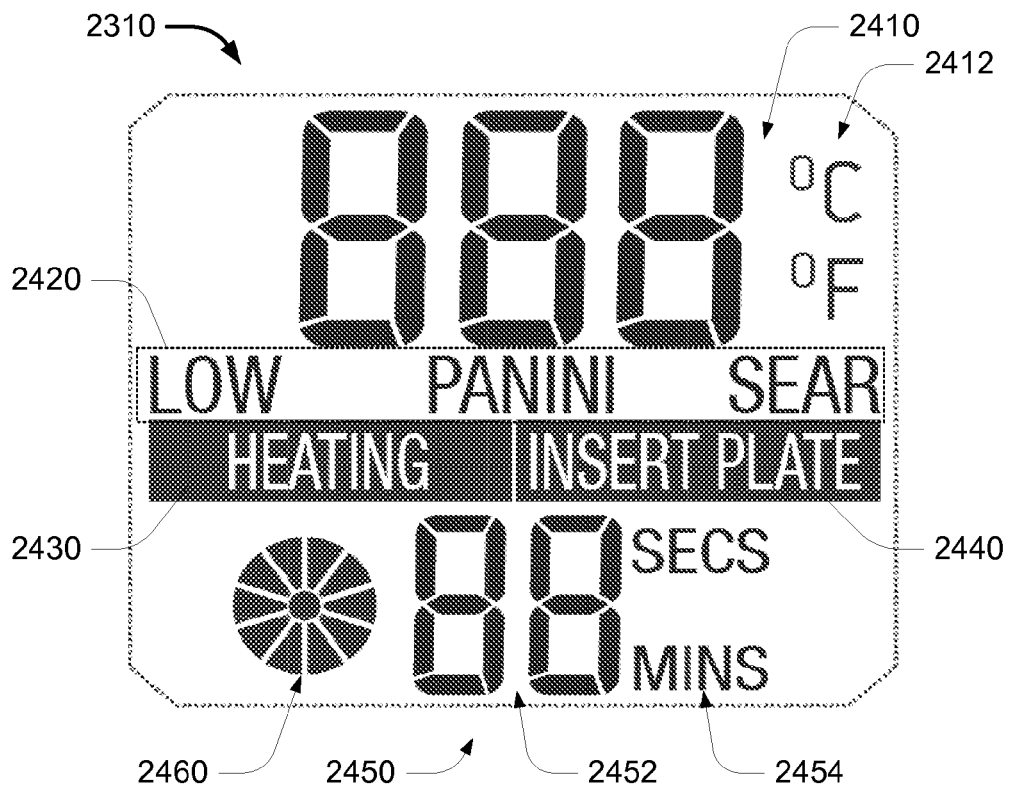
FIG. 24 is an embodiment display element according to the invention.

Referring to FIG. 24, the display element 2310 can further include a temperature display 2410 with a temperature unit display 2412, and a temperature range indicator 2420 (for example, indicating a LOW temperature range, a PANINI temperature range, a SEAR temperature range). A heating status indicator 2430 can indicate that a cooking plate has not yet reached its user set temperature and is in a heating state. An insert plate indicator 2440 can be used to indicate if one or more of the releasably engageable cooking plates have not been engaged to a respective upper or lower housing. A timer display 2450 can indicate the remaining time 2452 in units 2454 of seconds or minutes. A timer disk 2460 can comprise a plurality of pie segments that can be sequentially enabled or disabled to show a sequence of time.

By way of example only: digits displayed in an LCD display element can comprise seven segments; the timer disk can comprise ten pie segments and a centre segment, wherein the sequence of time can be displayed by sequentially illuminating pie segments around the disk until all pie segments are illuminated and then sequentially deactivating the pie segments until all segments have been deactivated; and the heating status indicator and insert plate indicator may be at least partially printed on the LCD panel.

It would be appreciated that a display element, for example an LCD display element, can be in the form of a colour display element. Displayed colour can be used to provide feedback to a user. By way of example blue/white can change to an orange/red for indicating states of operation such as heating/cooking/hot.

Figure 25:
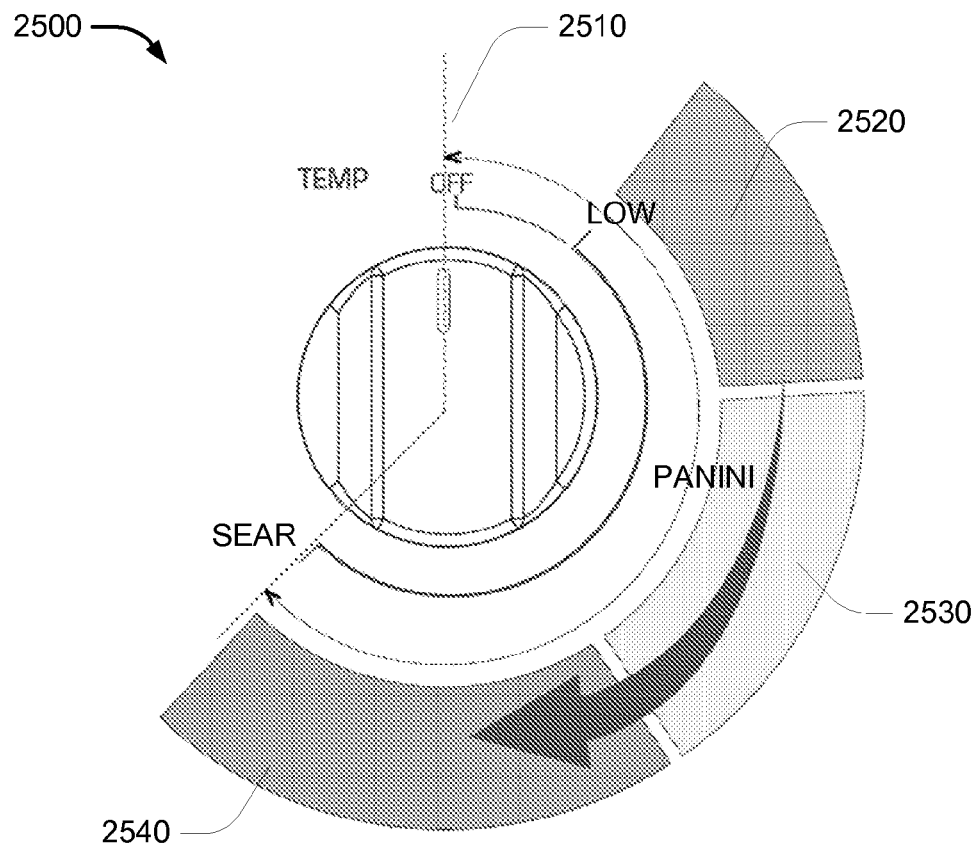
FIG. 25 is an embodiment temperature control dial according to the invention.

FIG. 25 shows an example embodiment temperature control dial 2500, which can be rotated for indicating a user defined temperature set point. In this example embodiment, the temperature control dial can be rotated from an off position 2510 through a LOW temperature range 2520, a PANINI temperature range 2530 and SEAR temperature range 2540. The LOW temperature range typically indicates the user temperature set point between 160 and 180 degrees Celsius, the PANINI temperature range typically indicates the user temperature set point between 180 and 210 degrees Celsius, and the SEAR temperature range typically indicates the user temperature set point between 210 and 230 degrees Celsius.

Figure 26:
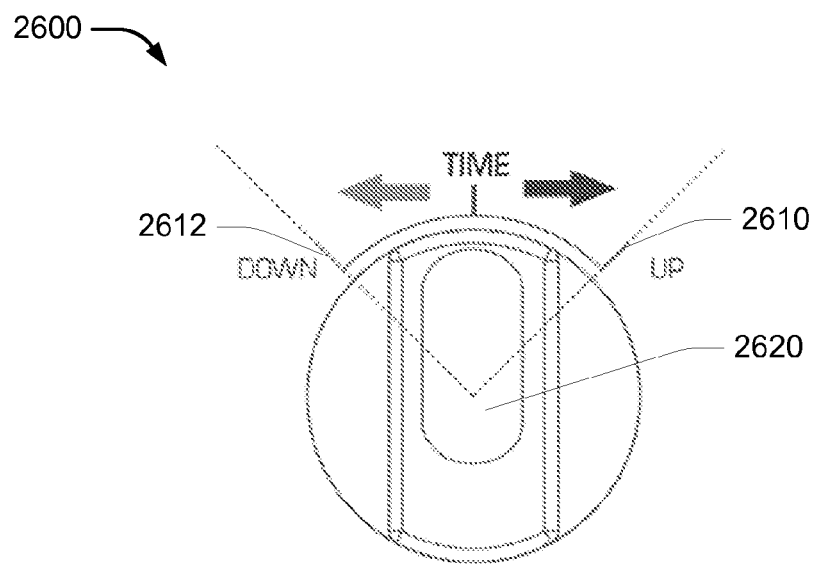
FIG. 26 is an embodiment timer control dial according to the invention.

FIG. 26 shows an embodiment timer control dial 2600 that can be used to define a user set time period. By way of example, the timer control dial can be rotated clockwise for increasing the time period or rotated anti clockwise for decreasing the time period. In this embodiment, the timer dial has a maximum turn angle 2610, 2612 in each of the clockwise and anti clockwise direction. By way of example only, the default setting for the timer can be OFF, enable a minimum user set time period of one minute and a maximum user set time period set of thirty minutes, with modification timer intervals of one minute. The timer control dial can further include a start/stop/pause push button 2620. Typically the LCD timer display shows a remaining time period in minutes until the final minute, wherein timer display shows remaining seconds. Upon reaching the end of the time period the timer display may flash, with or without synchronised audible beeps.

Figures 27A, 27B, 27C:
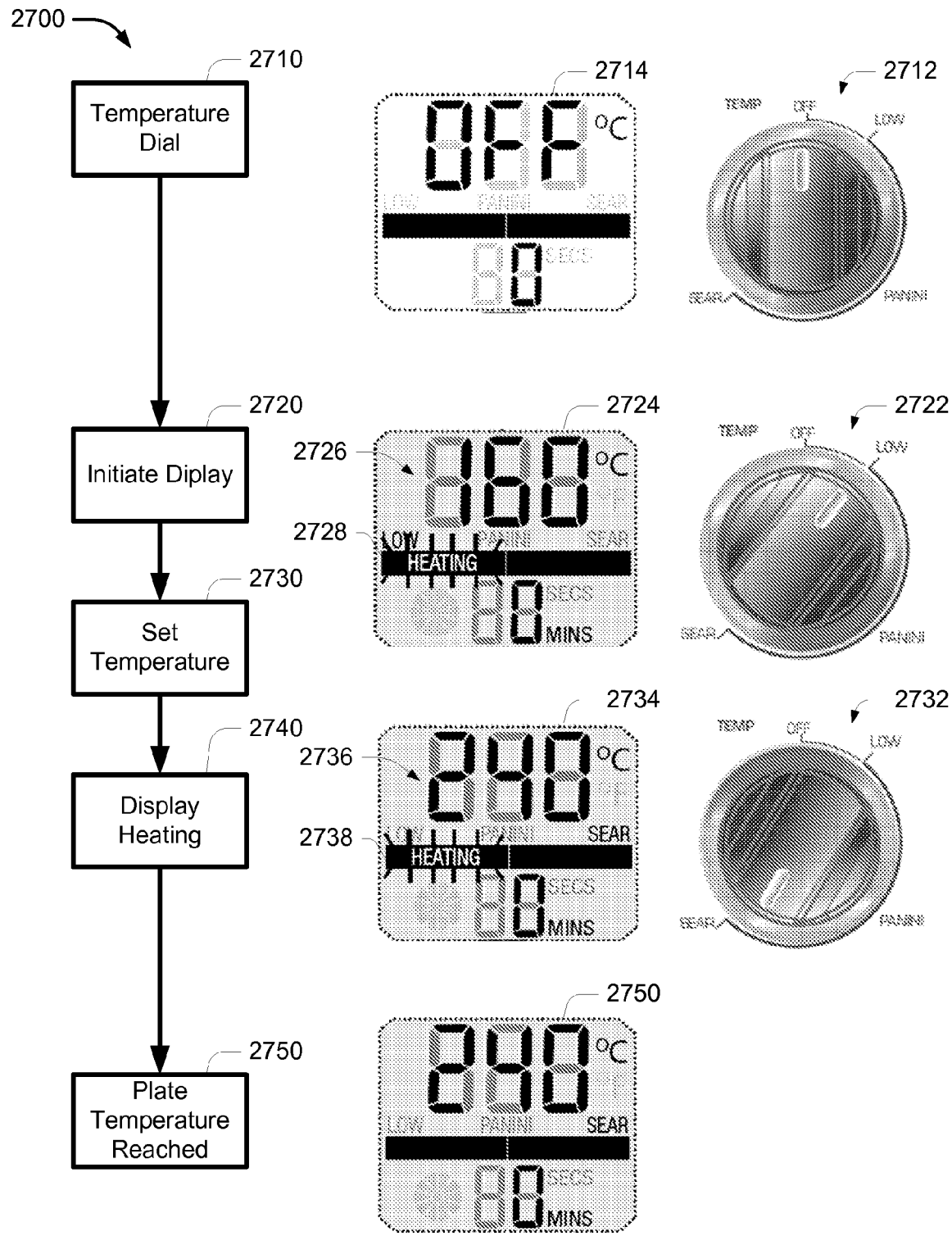
FIG. 27A shows a flowchart for setting a user defined temperature set point.
FIG. 27B shows display element configurations corresponding to steps for setting a user defined temperature set point.
FIG. 27C shows temperature control dial configurations corresponding to steps for setting a user defined temperature set point.

FIG. 27A, FIG. 27B and FIG. 27C show process steps involved in activating the cooking plates, and setting a user defined temperature set point. The method can comprise the steps of:

STEP 2710: The temperature control dial can be rotated to initiate heating of the cooking plates. The temperature control dial 2712 can be rotated from the off position (as further indicated in the LCD display element 2714) through to a user defined temperature setting.

STEP 2720: The temperature display can be initiated. In this example by rotating the temperature control dial into the low temperature range 2722, the LCD display element 2724 displays a temperature of 160 degrees Celsius 2726 and indicates that the cooking plates are in a heating state 2728.

STEP 2730: the temperature user defined set temperature can be established. In this example, the temperatures control dial 2732 can be further rotated to a sear temperature, whereby the LCD display element 2734 displays a temperature set point of 240 degrees Celsius 2736, and initially indicates the cooking plate status as being in heating state 2738.

STEP 2740: Continuing to display the heating status, while the temperature controller monitors a cooking plate temperature.

STEP 2750: The temperature controller identifies that the cooking plate temperature has reached the user defined temperature set point, whereby the LCD display element deactivates the cooking plate heating indicator.

Figure 28A:
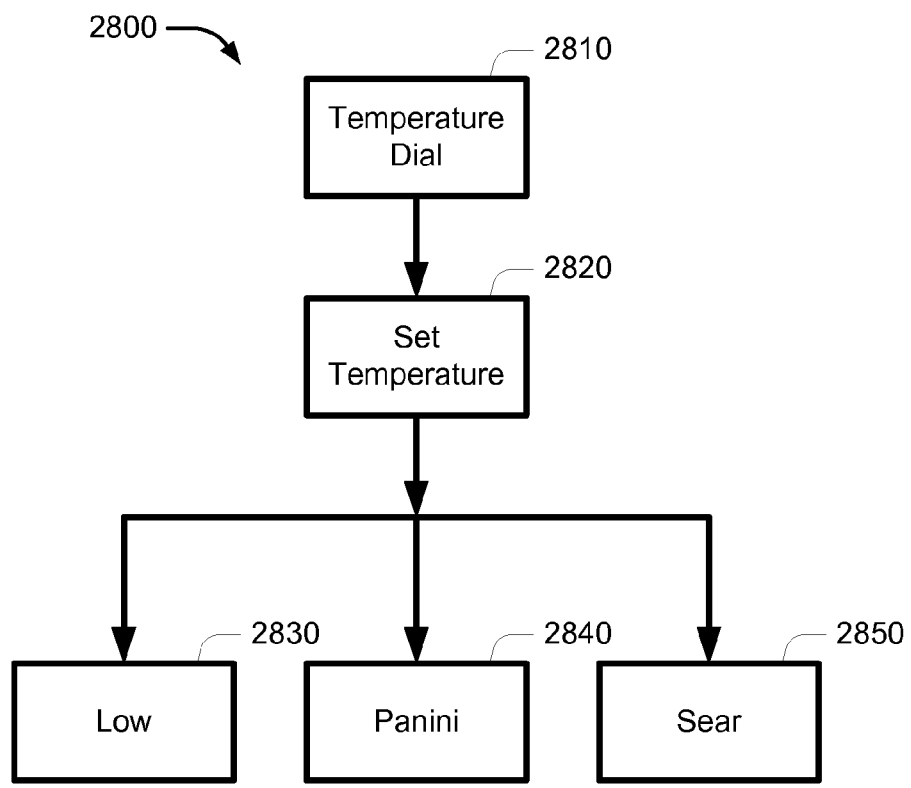
FIG. 28A shows a flowchart for setting a user defined temperature set point.
Figure 28B:
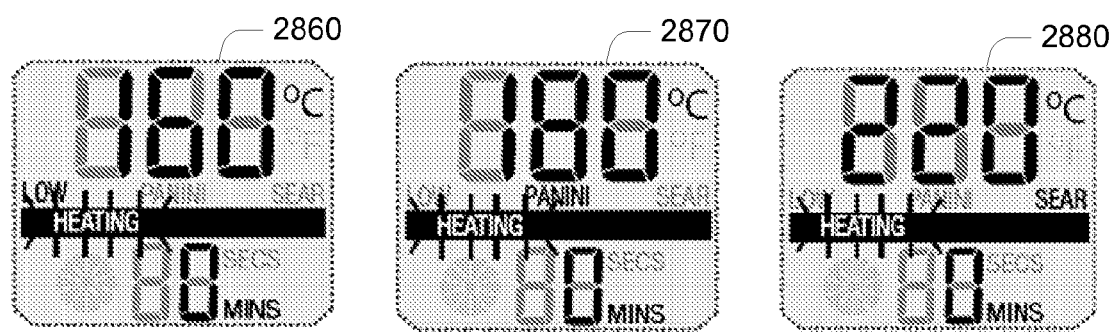
FIG. 28B shows display element configurations corresponding to steps for setting a user defined temperature set point.

FIG. 28A, FIG. 28B show process steps involved in setting the grill cooking plate temperature, and setting a user defined temperature set point. The method can comprise the steps of:

STEP 2810: Engaging the temperature control dial to initiate heating of a cooking plate;

STEP 2820: Adjusting the temperature control dial to establish a user defined temperature set point;

STEP 2830: If the user defined temperature set point is between 160 and 180 degrees Celsius, the display element displays a LOW temperature range setting;

STEP 2840: If the user defined temperature set point is between 180 and 210 degrees Celsius, the display element displays a PANINI temperature range setting;

STEP 2850: If the user defined temperature set point is between 210 and 230 degrees Celsius, the display element displays a SEAR temperature range setting;

By way of example, a user defined temperature set point can be adjusted by +/−5 degrees Celsius (or alternatively +/−10 degrees Fahrenheit) across a range of 160 through 230 degrees Celsius. A heating status indicator can flash, for example 0.5 second on and 0.5 seconds off, while a cooking plate temperature has not yet reached the user defined temperature set point. It will be appreciated that an upper cooking plate temperature set point and lower cooking plate temperature set point can be independently set for respectively controlling the temperature of the upper cooking plate and lower cooking plate.

Referring to FIG. 28B, by way of example only, the LED display element can display a LOW temperature range setting 2860, a PANINI temperature range setting 2870 and a SEAR temperature setting of 2880.

Figure 29A:
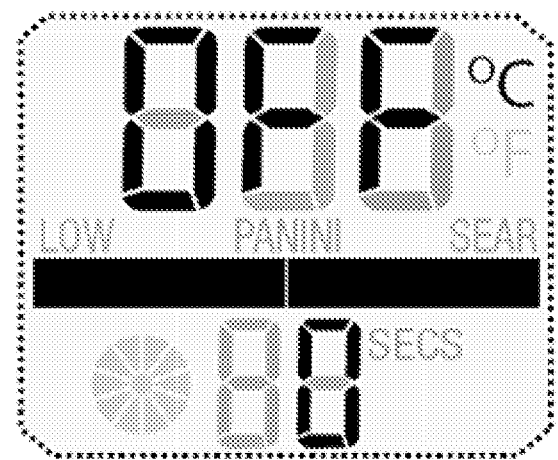
FIG. 29A shows display element configuration corresponding to an OFF state.

FIG. 29A shows an example LCD display element 2900 indicating that the temperature control dial has been set to OFF.

Figure 29B:
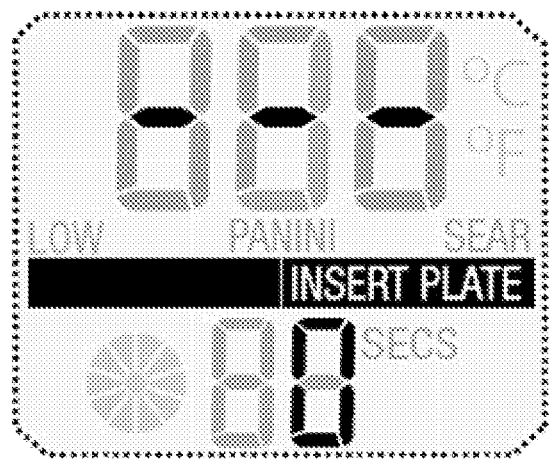
FIG. 29B shows display element configuration indicating one or more cooking plates have not been engaged.

FIG. 29B shows an example LCD display element 2910 indicating that one or more cooking plates have not been engaged. For example this can be the default display if an interlock switch associated with either of the upper or lower cooking plates is not closed.

It will be appreciated that there is disclosed a combination sandwich press and grill apparatus that is selectively configurable with replaceable cooking surfaces (or cooking hot plates) for enabling both cooking functions. Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors. Furthermore, a computer-readable carrier medium may form, or be included in a computer program product. Note that while some diagrams only show a single processor and a single memory that carries the computer-readable code, those in the art will understand that many of the components described above are included, but not explicitly shown or described in order not to obscure the inventive aspect.

The claims defining the invention are as follows:

1. A sandwich press and grill apparatus comprising:
a lower housing and an upper housing, each hingedly interconnected; wherein the lower housing is adapted to releasably engage a lower cooking plate, the lower housing including a first temperature sensor adapted to be in thermal communication with the lower cooking plate when the plate is engaged; wherein the upper housing is adapted to releasably engage an upper cooking plate, the upper housing including a second temperature sensor adapted to be in thermal communication with the upper cooking plate when the plate is engaged; a lower heating element being associated with the the lower cooking plate, and an upper heating element being associated with the the upper cooking plate;
a temperature controller adapted to receive at least one temperature set point signal and to independently control the temperature of the lower cooking plate and the upper cooking plate; and
wherein the first temperature sensor and the second temperature sensor each include:
a thermistor that provides a temperature signal to the temperature controller,
a thermostat adapted to provide a thermo-mechanical circuit breaker to disconnect the electrical supply to the respective heating element in the event of over-heating of the respective cooking plate, and
a shut-off switch for automatically enabling voltage at the respective heating element only when the respective cooking plate is engaged.

2. The apparatus according to claim 1, wherein:
the temperature controller being adapted to receive a first temperature measure signal from the first temperature sensor, the first temperature measure signal being indicative a temperature of the lower cooking plate; and
the temperature controller being adapted to receive a second temperature measure signal from the second temperature sensor, the second temperature measure signal being indicative a temperature of the upper cooking plate.

3. The apparatus according to claim 2, wherein the temperature controller is adapted to independently control temperature of each of the lower cooking plate and the upper cooking plate.

4. The apparatus according to claim 3, wherein each of the least one temperature set point signal associated with the upper cooking plate and lower cooking plate is user controllable.

5. The apparatus according to claim 4, wherein the lower cooking plate and the upper cooking plate are independently controllable to a respective set cooking temperature.

6. The apparatus according to claim 1, the lower housing has a first releasable power coupling element for providing electrical power to the lower heating element that is integrally formed with the lower cooking plate, and the upper housing has a second releasable power coupling element for providing electrical power to the upper heating element that is integrally formed with the upper cooking plate; and wherein each power coupling element defines three power socket elements, each adapted to receive a co-operative power contact element of each respective heating element.

7. The apparatus according to claim 6, wherein each power coupling element has a moveable guard element for shielding the power socket elements when each respective cooking plate is not engaged.

8. The apparatus according to claim 7, wherein each moveable guard element is slideably moveable in co-operation with receiving the power contact element of the respective heating element.

9. The apparatus according to claim 1, wherein each temperature sensor is biased to abut each respective cooking plate in providing thermal communication, and the bias of each temperature sensor is integral to operation of the shut-off switch.

10. The apparatus according to claim 1, wherein the lower cooking plate and the upper cooking plate are interchangeable.

11. The apparatus according to claim 10, wherein a drip tray is carried by the lower housing, and the drip tray collects from the centre of each cooking plate.

12. The apparatus according to claim 1, wherein the upper housing is supported by a "U" shaped frame having two side arms hingedly connected to the lower housing, each side arm of the "U" shaped frame has a pivot for supporting the upper housing.

13. The apparatus according to claim 12, the 'U' shaped frame is hinged to provide an immediate and locked orientation that can be defeated to enable the apparatus to be opened to a full open grill position.

14. The apparatus according to claim 1, wherein the temperature controller is operatively associated with a control panel.

15. The apparatus according to claim 14, wherein the control panel includes:
a temperature control dial for setting the least one temperature set point signal;
a timer control dial for setting a user defined time period; and
a display element for displaying data indicative of the least one temperature set point and the user defined time period.

* * * * *